United States Patent
Behzadi et al.

(10) Patent No.: US 11,435,453 B1
(45) Date of Patent: *Sep. 6, 2022

(54) TECHNIQUES FOR SIMULTANEOUS DETERMINATION OF RANGE AND VELOCITY WITH ACTIVE MODULATION

(71) Applicant: Aeva, Inc., Mountain View, CA (US)

(72) Inventors: Behsan Behzadi, Menlo Park, CA (US); Mina Rezk, Haymarket, VA (US); Kumar Bhargav Viswanatha, Santa Clara, CA (US); Esha John, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,569

(22) Filed: Oct. 27, 2021

Related U.S. Application Data

(60) Provisional application No. 63/175,414, filed on Apr. 15, 2021.

(51) Int. Cl.
*G01S 7/4913* (2020.01)
*G01S 17/58* (2006.01)
(Continued)

(52) U.S. Cl.
CPC ............ *G01S 7/4913* (2013.01); *G01S 17/06* (2013.01); *G01S 17/26* (2020.01); *G01S 17/34* (2020.01); *G01S 17/58* (2013.01)

(58) Field of Classification Search
None
See application file for complete search history.

(56) References Cited

U.S. PATENT DOCUMENTS 4,846,571 A * 7/1989 Jelalian ................. G01S 7/4917
356/28.5
10,802,120 B1 10/2020 LaChapelle et al.
(Continued)

FOREIGN PATENT DOCUMENTS

CN 112051582 A 12/2020

OTHER PUBLICATIONS

Baghmisheh, Vehnam Behroozpour, "Chip-Scale Lidar", University of California, Berkeley, https://escholarship.org/uc/item/01b3362w . . . Copyright 2016, 45 pages.
(Continued)

*Primary Examiner* — Yuqing Xiao
*Assistant Examiner* — Benjamin Richard Hebert
(74) *Attorney, Agent, or Firm* — Compass IP Law PC

(57) ABSTRACT

A light detection and ranging (LIDAR) system encodes a frequency modulation (FM) modulated signal with a time of flight (TOF) signal as a power and frequency modulated signal. The system can emit the power and frequency modulated signal and apply processing to a signal reflection to generate a target point set. The target point set processing can include frequency processing to generate target points based on range and Doppler information, and TOF processing to provide TOF range information. The LIDAR system can include a modulator to AM modulate an FM modulated light signal with an active modulator to provide the TOF signal information with the FM modulated signal as the power and frequency modulated signal.

21 Claims, 25 Drawing Sheets

(51) Int. Cl.
*G01S 17/34* (2020.01)
*G01S 17/06* (2006.01)
*G01S 17/26* (2020.01)

(56) References Cited

U.S. PATENT DOCUMENTS

| | | |
|---|---|---|
| 10,960,900 B1 | 3/2021 | Crouch et al. |
| 11,029,395 B1 | 6/2021 | Barber et al. |
| 2007/0103362 A1 | 5/2007 | Arikan et al. |
| 2009/0059201 A1 | 3/2009 | Willner et al. |
| 2014/0035776 A1 | 2/2014 | Sochen et al. |
| 2016/0377721 A1 | 12/2016 | Lardin et al. |
| 2017/0146639 A1 | 5/2017 | Carothers |
| 2018/0081061 A1 | 3/2018 | Mandai et al. |
| 2019/0011558 A1* | 1/2019 | Crouch .................... G08G 1/16 |
| 2019/0086514 A1 | 3/2019 | Dussan et al. |
| 2019/0086517 A1 | 3/2019 | Puglia et al. |
| 2019/0086550 A1 | 3/2019 | Dussan et al. |
| 2019/0187269 A1 | 6/2019 | Tong et al. |
| 2019/0204441 A1 | 7/2019 | Feneyrou et al. |
| 2020/0072979 A1 | 3/2020 | Boloorian et al. |
| 2020/0142066 A1 | 5/2020 | Sandborn et al. |
| 2020/0158831 A1 | 5/2020 | Niclass et al. |
| 2020/0271784 A1 | 8/2020 | Bradford et al. |
| 2020/0292706 A1 | 9/2020 | Hexsel et al. |
| 2020/0300993 A1 | 9/2020 | Behzadi et al. |
| 2021/0096228 A1 | 4/2021 | Behzadi et al. |
| 2021/0132226 A1 | 5/2021 | Rezk et al. |
| 2021/0286057 A1 | 9/2021 | Rezk |
| 2021/0373172 A1* | 12/2021 | Solomentsev ........ G01S 17/931 |
| 2022/0011417 A1* | 1/2022 | Hao ..................... G01S 7/4911 |

OTHER PUBLICATIONS

Notice of Allowance for U.S. Appl. No. 17/512,570, dated Apr. 5, 2022, 10 pages.
Ram Bilas Pachori and Pradip Sircar "Analysis of multicomponent AM-FM signals using FB-DESA method". (Year 2010).
First Office Action for U.S. Appl. No. 17/512,576, dated Feb. 10, 2022, 9 pages.

* cited by examiner

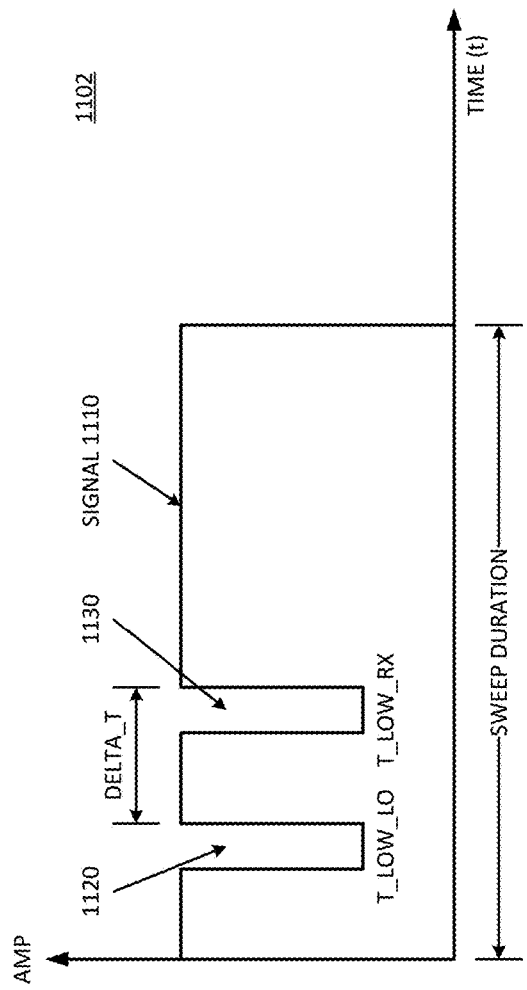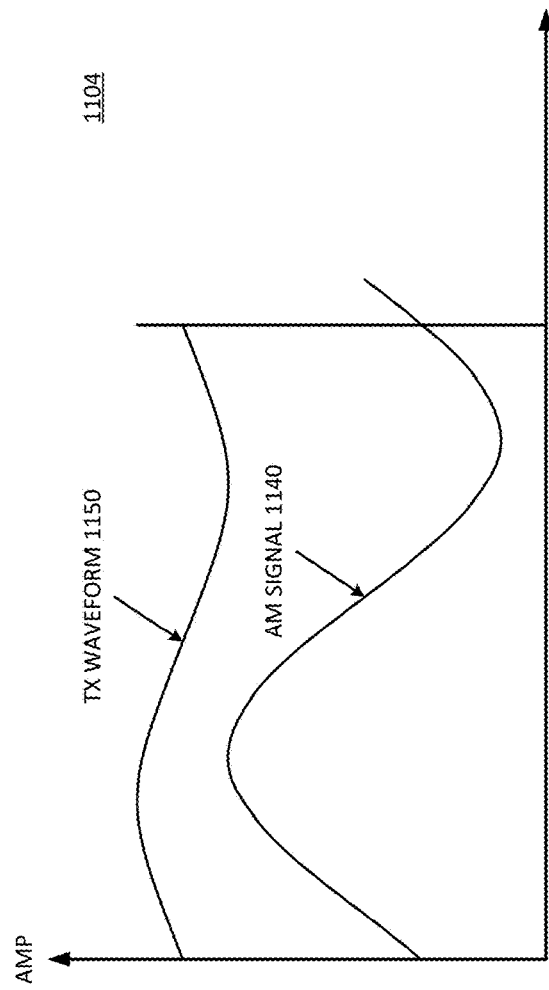
FIG. 11A
FIG. 11B

TECHNIQUES FOR SIMULTANEOUS DETERMINATION OF RANGE AND VELOCITY WITH ACTIVE MODULATION

RELATED APPLICATIONS

This application is a nonprovisional application based on, and claims priority to, U.S. Provisional Application No. 63/175,414 filed Apr. 15, 2021. That provisional application is incorporated herein by reference.

This application is related to U.S. patent application Ser. No. 17/512,570, titled: TECHNIQUES FOR SIMULTANEOUS DETERMINATION OF RANGE AND VELOCITY WITH PASSIVE MODULATION, and U.S. patent application Ser. No. 17/512,576, titled: TECHNIQUES FOR DETECTION PROCESSING WITH AMPLITUDE MODULATION (AM) AND FREQUENCY MODULATION (FM) PATHS FOR SIMULTANEOUS DETERMINATION OF RANGE AND VELOCITY, both filed concurrently herewith.

FIELD

Descriptions are generally related to light scanning systems, and more particularly, coherent LIDAR (light detection and ranging) systems.

BACKGROUND

Some light scanning systems, such as frequency-modulated continuous-wave (FMCW) LIDAR systems, utilize "upchirp" (or "up sweep") and downchirp (or "down sweep") signals to capture information related to surrounding targets. However, in some scenarios, waiting for these signals to be transmitted and received can limit the ability of these systems to quickly and efficiently obtain target information, such as velocity, range, or other information, or a combination of information. In addition, these light scanning systems can alias short range targets which can lead to disambiguation issues.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 11A illustrates an example of an AM signal with on/off modulation with local oscillator and transmit paths modulated.

FIG. 11B illustrates an example of an AM signal with a modulation waveform with local oscillator and transmit paths modulated.

Descriptions of certain details and implementations follow, including non-limiting descriptions of the figures, which may depict some or all examples, as well as other potential implementations.

DETAILED DESCRIPTION

As described herein, a frequency-modulated continuous-wave (FMCW) light detection and ranging (LIDAR) system provides amplitude modulation (AM) or time of flight (TOF) signaling to a frequency modulation (FM) modulated light signal. The application of AM modulation or TOF signaling to the FMCW signal enables range and velocity measurement simultaneously from the return signal.

A LIDAR system can provide TOF information with an FM modulated signal or frequency modulated signal as a power and frequency modulated signal. When the power and frequency modulated signal is transmitted to a target, the system can process reflection signals from the target to generate a point set (e.g., data point cloud, target point set, and the like). The target point set processing can include frequency processing to generate target points based on range and Doppler information, and TOF processing to provide TOF range information. The LIDAR system can generate an FM modulated signal and provide the FM modulated signal with TOF signal information via an active modulator or a passive modulator. The combined signal is a power and frequency modulated signal.

According to some examples, the described LIDAR system may be implemented in any sensing market, such as, but not limited to, transportation, manufacturing, metrology, medical, augmented reality, virtual reality, and security systems. According to some examples, the described LIDAR system is implemented as part of a front-end of frequency modulated continuous-wave (FMCW) device that assists with spatial awareness for automated driver assist systems or self-driving vehicles, such as part of an automobile, motorcycle, bicycle, scooter, helicopter, or plane, or other vehicle.

Figure 1:
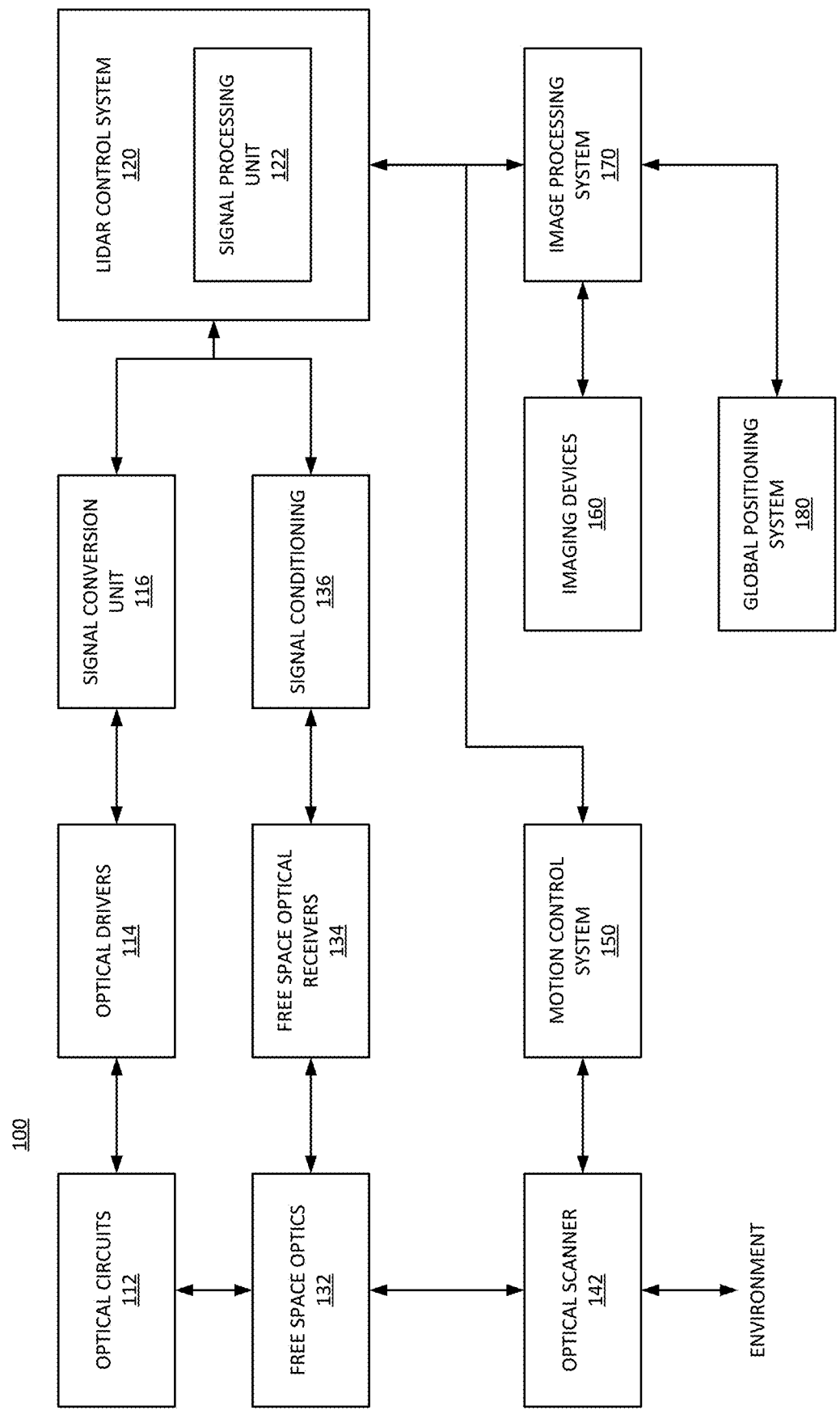
FIG. 1 illustrates an example LIDAR system.

FIG. 1 illustrates an example LIDAR system. The LIDAR system 100 includes one or more of each of a number of components, but may include fewer or additional components than what is illustrated. One or more of the components depicted in LIDAR system 100 can be implemented on a photonics chip, according to some examples. As shown, the LIDAR system 100 includes optical circuits 112 implemented on a photonics chip. In one example, optical circuits 112 include active optical components. In one example, optical circuits include passive optical components. In one example, optical circuits 112 include a combination of active optical components and passive optical components. Active optical components refer to components that can generate, amplify, or detect optical signals, or perform a combination of generate, amplify, or detect. In some examples, the active optical component performs operations on optical beams at different wavelengths, and includes one or more optical amplifiers, one or more optical detectors, or other components to perform operations on the light signal.

Free space optics 132 refers to one or more components that can carry optical signals and route and manipulate optical signals between appropriate input or output ports of the optical circuit and the components of the optical circuit. In one example, free space optics 132 includes one or more optical components such as taps, wavelength division multiplexers (WDM), splitters/combiners, polarization beam splitters (PBS), collimators, couplers, or other components to direct an optical signal. In some examples, free space optics 132 includes components to transform the polarization state and direct received polarized light, for example, to optical detectors using a PBS. In one example, free space optics 132 includes a diffractive element to deflect optical beams having different frequencies at different angles along an axis (e.g., a fast axis).

In some examples, LIDAR system 100 includes optical scanner 142 that includes one or more scanning mirrors that are rotatable along an axis (e.g., a slow axis) that is orthogonal or substantially orthogonal to the fast axis of the diffractive element. Optical scanner 142 can steer optical signals to scan an environment according to a scanning pattern. For instance, the scanning mirrors can be rotatable by one or more galvanometers. Incident light from a source optical signal tends to scatter off objects in a target environment, generating a return optical beam or a target return signal. Optical scanner 142 can collect the return optical beam or the target return signal and provide the return signal for processing. Optical scanner 142 can return the signal to passive optical circuit components or active optical circuit components of optical circuits 112. For example, free space optics 132 can direct a signal to an optical detector via a polarization beam splitter. In addition to mirrors and galvanometers, examples of optical scanner 142 can include components such as a quarter-wave plate, lens, anti-reflective coated window, or other component to receive an optical signal.

To control and support optical circuits 112 and optical scanner 142, LIDAR system 100 includes LIDAR control system 120. LIDAR control system 120 includes a signal processor, control component, or other device to process control operations for LIDAR system 100. The signal processor represents a processing device to control the operation of LIDAR system 100. The signal processor can be or include, for example, one or more general-purpose processing devices such as a microprocessor, central processing unit, processing component, or other controller/processor. The signal processor can be, for example, a complex instruction set computing (CISC) microprocessor, a reduced instruction set computer (RISC) microprocessor, a very long instruction word (VLIW) microprocessor, or a processor implementing other instruction sets, or processors implementing a combination of instruction sets. In one example, the signal processor can be or include one or more special-purpose processing devices such as an application specific integrated circuit (ASIC), a field programmable gate array (FPGA), a digital signal processor (DSP), network processor, or other computation component.

In some examples, LIDAR control system 120 includes signal processing unit 122. Signal processing unit 122 represents a processing device specific for performing signal computations. For example, signal processing unit 122 can be a DSP. LIDAR control system 120 can be configured to output digital control signals to control optical drivers 114. In some examples, the digital control signals can be converted to analog signals through signal conversion unit 116. For example, signal conversion unit 116 can include a digital-to-analog converter (DAC). Optical drivers 114 can provide drive signals to active optical components of optical circuits 112 to drive optical sources such as lasers and amplifiers. In some examples, several optical drivers 114 and signal conversion units 116 can be provided to drive multiple optical sources.

LIDAR control system 120 can be configured to output digital control signals for optical scanner 142. Motion control system 150 can control galvanometers or other movable components of optical scanner 142 based on control signals received from LIDAR control system 120. For example, a DAC can convert coordinate routing information from LIDAR control system 120 to signals interpretable by galvanometers in optical scanner 142. In some examples, motion control system 150 can return information to LIDAR control system 120 about the position or operation of components of optical scanner 142. For example, an analog-to-digital converter (ADC) can convert information about a galvanometer's position to a signal interpretable by LIDAR control system 120.

LIDAR control system 120 can be configured to analyze incoming digital signals. In this regard, LIDAR system 100 includes free optical receivers 134 to measure one or more beams received by free space optics 132, which can also be passed to optical circuits 112. For example, a reference beam receiver can measure the amplitude of a reference beam from an active optical component, and an ADC converts signals from the reference receiver to signals interpretable by LIDAR control system 120. Target receivers measure the optical signal that carries information about the range and velocity of a target in the form of a beat frequency, modulated optical signal. The reflected beam can be mixed with a signal from a local oscillator. Optical receivers 134 can include a high-speed ADC to convert signals from the target receiver to signals interpretable by LIDAR control system 120. In some examples, signal conditioning unit 136 can perform signal conditioning on signals from optical receivers 134 prior to receipt by LIDAR control system 120. For example, the signals from optical receivers 134 can be provided to an operational amplifier (op-amp) for amplification of the return signals and the amplified signals can be provided to LIDAR control system 120.

In some applications, LIDAR system 100 includes one or more imaging devices 160 configured to capture images of the environment, global positioning system (GPS) 180 configured to provide a geographic location of the system, or other sensor inputs. Image processing system 170 represents one or more components configured to receive the images from imaging devices 160 or geographic location from GPS 180 and prepare the information for receipt and use by LIDAR control system 120 or other system connected to LIDAR system 100. For example, image information can be pre-processed for use by LIDAR control system 120. In another example, location information can be formatted for use by LIDAR system 100.

In some examples, the scanning process begins with optical drivers 114 and LIDAR control system 120. LIDAR control system 120 can instruct optical drivers 114 to independently modulate one or more optical beams, and these modulated signals propagate through the optical circuit to a collimator. The collimator directs the light at the optical scanning system that scans the environment over a preprogrammed pattern defined by motion control system 150. Optical circuits 112 can include a polarization wave plate (PWP) to transform the polarization of the light as it leaves optical circuits 112. In some examples, the polarization wave plate can be a quarter-wave plate or a half-wave plate. A portion of the polarized light can be reflected back to optical circuits 112. For example, lensing or collimating systems used in LIDAR system 100 can have natural reflective properties or a reflective coating to reflect a portion of the light back to optical circuits 112.

Optical signals reflected back from the environment pass through optical circuits 112 to the receivers. If the polarization of the light has been transformed, it can be reflected by a polarization beam splitter (PBS) along with the portion of polarized light that was reflected back to optical circuits 112. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to optical receivers 134.

Optical receivers 134 can apply ADCs to convert the analog signals from optical receivers to digital signals. The digital signals are then sent to LIDAR control system 120. Signal processing unit 122 can receive the digital signals and interpret them. In some examples, signal processing unit 122 also receives position data from motion control system 150 and galvanometers (not shown) as well as image data from image processing system 170. Signal processing unit 122 can then generate a 3D point cloud with information about range and velocity of points in the environment as optical scanner 142 scans additional points. Signal processing unit 122 can also overlay a 3D point cloud data with the image data to determine velocity and distance of objects in the surrounding area. In one example, LIDAR system 100 processes satellite-based navigation location data to provide a precise global location.

In operation according to some examples, LIDAR system 100 is configured to simulate aspects of time of flight signal processing by performing amplitude modulation on a frequency modulated source signal to enable measurement of time of flight as well as range and velocity simultaneously from the return signal.

In one example, the FM signal can include TOF information by lowering power or powering off the beam going towards a target for a limited portion of the frequency sweep. In one example, the power is reduced to a low power modulation (TPower Low) during the sweep. In one example, the low power state can be when the modulation is turned off (TPower Off) during the sweep. In one example, the power can be in low power or off state at the beginning of the sweep. In one example, the power can be in low power or off state at the beginning of the up sweep and at the beginning of the down sweep. As one or more beam reflections come back from the target, the TPower signal can be offset in time (TTOF or time of the time of flight signal) with a value corresponding to the range of the object based, at least in part, on one or more signal propagation delays between LIDAR system 100 and one or more targets. Thus, in this fashion, signal conversion unit 116 and optical drivers 114 can modulate TOF information onto an FMCW signal. Optical circuits 112 and free space optics 132 can send the signal to the environment for scanning. One or more circuits, units, systems, or devices of LIDAR system 100 can enter low power mode before, during, and/or after the TPower signal.

Return signals received through free space optics 132 and free space optical receivers 134 can be processed with signal conditioning 136 and processed by LIDAR control system 120. Signal processing unit 122 can compute a TTOF and provide a range measurement that is not a function of Doppler, while the beat frequency is a function of range and Doppler. LIDAR system 100 can be configured to perform range and Doppler calculation with a single measurement by combining the information of the TTOF and beat frequency.

In one example, the FM signal can include AM modulation of any type. The AM modulation can be or include passive modulation or active modulation. The AM information can be extracted separately from the FM modulation, enabling the system to perform range and Doppler determination concurrently. FM modulation low power or power off (TPower Low) can be considered a specific case of AM modulation on the FMCW signal. In some scenarios, signals transmitted and/or processed by LIDAR system 100 can include any type of FM and AM modulation.

In one example, the system computes an estimate of the range using a time domain processing datapath including a correlator and a delay estimator. The estimate of range in combination with frequency domain peaks leads to a more robust estimate of range and velocity per point. As stated above, the system can provide the modulation actively or passively. The active modulation can be active amplitude modulation with an active amplitude modulator. The passive modulation can be passive amplitude modulation with a passive amplitude modulator. For active modulation, the system can provide modulation using a Mach-Zehnder modulator (MZM), modulating optical amplifier gain signal, amplifier gain signal, an optical attenuator, attenuator, laser AM modulation, saturable absorber, optical switch, or other active modulator.

In some scenarios, only the transmit signal (TX) or transmit path is modulated. In such a case, the TTOF can be calculated from the electrical signal on an MZM or OA and the low TPower of the received (RX) signal. In some scenarios, the modulation is done in both the TX and local oscillator (LO) path. In such a case, the TTOF can be extracted from the difference in LO and RX signal.

In some scenarios, modulation is done using passive modulation. For example, the system can apply a Mach-Zehnder interferometer (MZI). The system can apply another type of passive amplitude modulation. The system can extract the TOF data from the RX+LO modulation. In some scenarios, the AM part of the FM modulation can be extracted using an I/Q detector.

Figure 2:
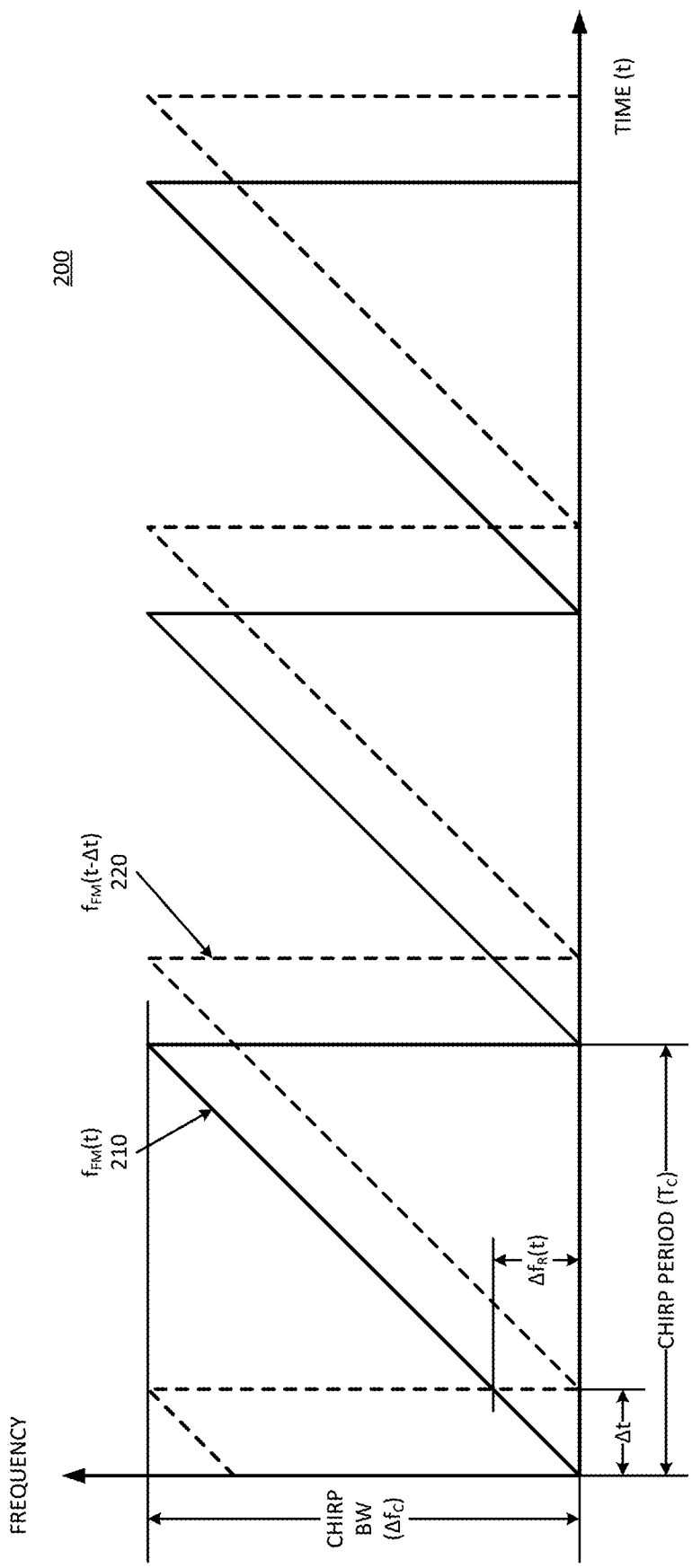
FIG. 2 represents a time-frequency diagram illustrating an example of LIDAR waveform detection and processing.

FIG. 2 represents a time-frequency diagram illustrating an example of LIDAR waveform detection and processing. Diagram 200 represents a time-frequency diagram of an FMCW scanning signal 210 that can be used by a LIDAR system, such as system 100, to scan a target environment according to some examples. In one example, the scanning waveform 210, labeled as $f_{FM}(t)$, is a sawtooth waveform (sawtooth "chirp") with a chirp bandwidth $\Delta f_C$ and a chirp period $T_C$.

The slope of the sawtooth is given as $k=(\Delta f_C/T_C)$. Diagram 200 also depicts target return signal 220 according to some examples. Target return signal 220, labeled as $f_{FM}(t-\Delta t)$, is a time-delayed version of scanning signal 210, where $\Delta t$ is the roundtrip time to and from a target illuminated by scanning signal 210. The roundtrip time is given as $\Delta t=2R/v$, where R is the target range, and v is the velocity of the optical beam, which is the speed of light c. The target range, R, can therefore be calculated as $R=c(\Delta t/2)$.

When return signal 220 is optically mixed with scanning signal 210, a range-dependent difference frequency, referred to as the beat frequency, $\Delta f_R(t)$ is generated. The beat frequency $\Delta f_R(t)$ is linearly related to the time delay, $\Delta t$, by the slope of the sawtooth k. Thus, $\Delta f_R(t)=k\Delta t$. Since the target range R is proportional to $\Delta t$, the target range R can be calculated as $R=(c/2)(\Delta f_R(t)/k)$. Thus, the range R is linearly related to the beat frequency $\Delta f_R(t)$.

The beat frequency $\Delta f_R(t)$ can be generated, for example, as an analog signal in optical receivers 134 of system 100. The beat frequency can then be digitized by an ADC, for example, in a signal conditioning unit such as signal conditioning unit 136 in LIDAR system 100. The digitized beat frequency signal can then be digitally processed, for example, in a signal processing unit, such as signal processing unit 122 in system 100.

It will be understood that target return signal 220 will, in general, also include a frequency offset (Doppler shift) if the target has a velocity relative to the LIDAR system. The Doppler shift can be determined separately, and used to correct the frequency of the return signal, so the Doppler shift is not shown in diagram 200 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit").

In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $Rmax=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system. In one example, and without limitation, a time segment might correspond to a predetermined number of chirp periods T, or a number of full rotations in azimuth by the optical scanner.

Figure 3:
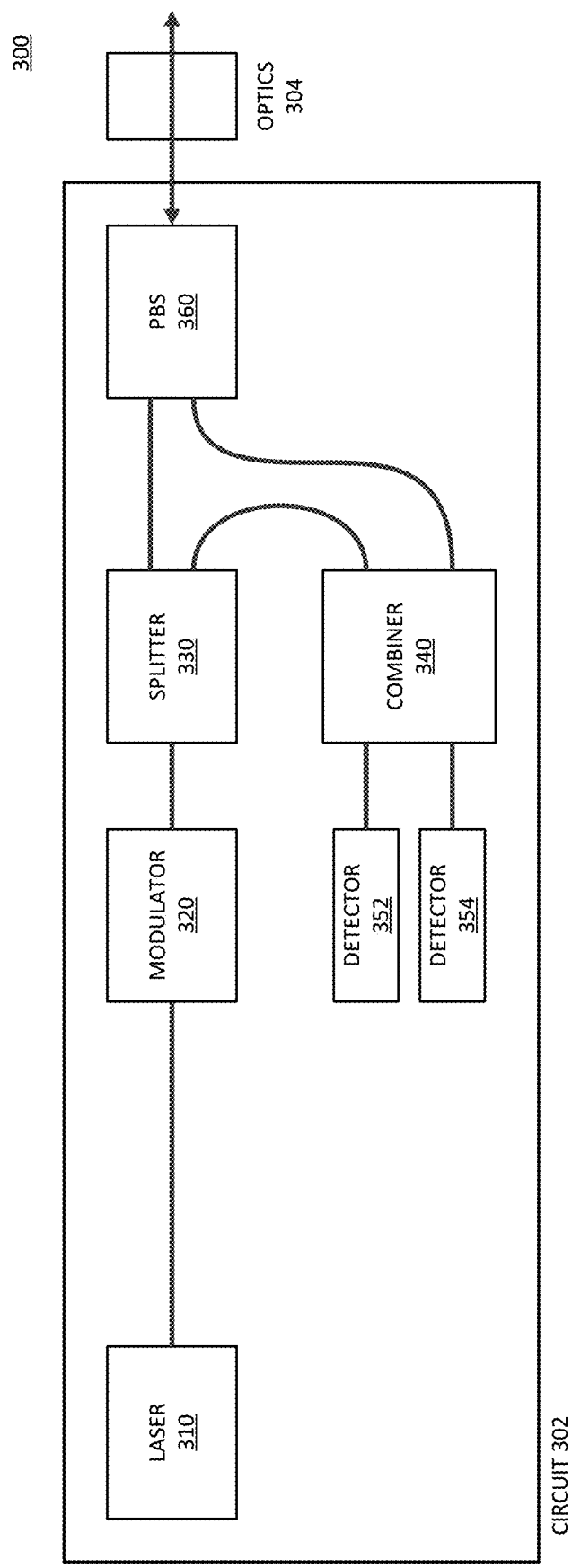
FIG. 3 illustrates an example of a LIDAR system with active modulation to provide a combined FM and AM signal.

FIG. 3 illustrates an example of a LIDAR system with active modulation to provide a combined FM and AM signal according to embodiments of the present disclosure. System 300 illustrates a LIDAR system that may include one or more functions included in LIDAR system 100. System 300 can include separate processing components (not specifically shown). For instance, according to some embodiments, PBS 360 and optics 304 can be portions of free space optics 132. Laser 310, modulator 320, and combiner 340 can be portions of optical circuits 112. Detectors 352, 354 can be portions of free space optical receivers 134.

System 300 includes at least one laser 310 which includes the functionality to produce a light signal that is processed by one or more optical circuit elements of the optical circuitry of circuit 302. Circuit 302 can include modulator 320 to modulate the light signal transmitted from laser 310. In one example, laser 310 is a continuous-wave laser. In one example, modulator 320 is an SOA (semiconductor optical amplifier). The modulation techniques performed by modulator 320 can include, but is not limited to, FM modulation, AM modulation, and the like. In one scenario, modulator 320 can be or include an FM modulator to FM modulate the source signal. In another scenario modulator 320 includes an amplification component.

In one example, modulator 320 includes the functionality to perform modulation procedures within and/or using a lower power mode provided by one or more components providing power supply to LIDAR system 300. Examples of low power include, but are not limited to, sleep modes, standby modes, or similar power states. In one scenario, modulator 320, using one or more active modulator components within, can modulate light signals received to produce a power and FM signal and/or AM signal. In one example, the TOF signal information provided by modulator 320 includes an AM signal modulated onto the FM modulated signal. In one example, modulator 320 is an active modulator. The modulator 320 can be or include, for example, a Mach-Zehnder modulator (MZM). The modulator 320 can be or include, for example, an optical attenuator. The modulator 320 can be or include, for example, an optical circuit to AM modulate an optical amplifier gain signal.

Splitter 330 represents a splitter or optical coupler to steer the modulated optical signal to optical transmit components and a local path for beam combining. Thus, splitter 330 can split the modulated signal to send the signal along a transmit (TX) path to a circulator or PBS (polarized beam splitter) 360 that emits the modulated LIDAR signal through free space optics 304.

PBS 360 and optics 304 can represent an optical emitter to emit the power and frequency modulated signal from system 300. Optics 304 and PBS 360 can also represent receiver components to receive a reflection of the emitted LIDAR signal. The received reflection signal can be routed through PBS 360 or circulator to optical combiner 340.

Combiner 340 can receive a reference signal from splitter 330 and the reflection signal from PBS 360. Combiner 340 provides the signals to one or more photodetectors, identified as detector 352 and detector 354. Detector 352 and detector 354 can provide the signal information to one or more processing components. Circuit 302 can provide optical signal information to a processor or component for final signal processing.

The processing components, based on the signals from the detectors from circuit 302, can extract TOF information from an AM modulated signal and determine the range and velocity of targets identified in the scanning using an FM modulated signal. The processing components can map targets with a point set with per point information based on the combined AM and FM signal.

The processing components (not specifically shown) receive detected signal information from detector 352 and detector 354 and apply signal processing on the reflection signal to generate a target point set. The processing can include frequency processing to generate target points based on range and Doppler information. The processing can also include TOF processing to provide TOF range information.

Figure 4:
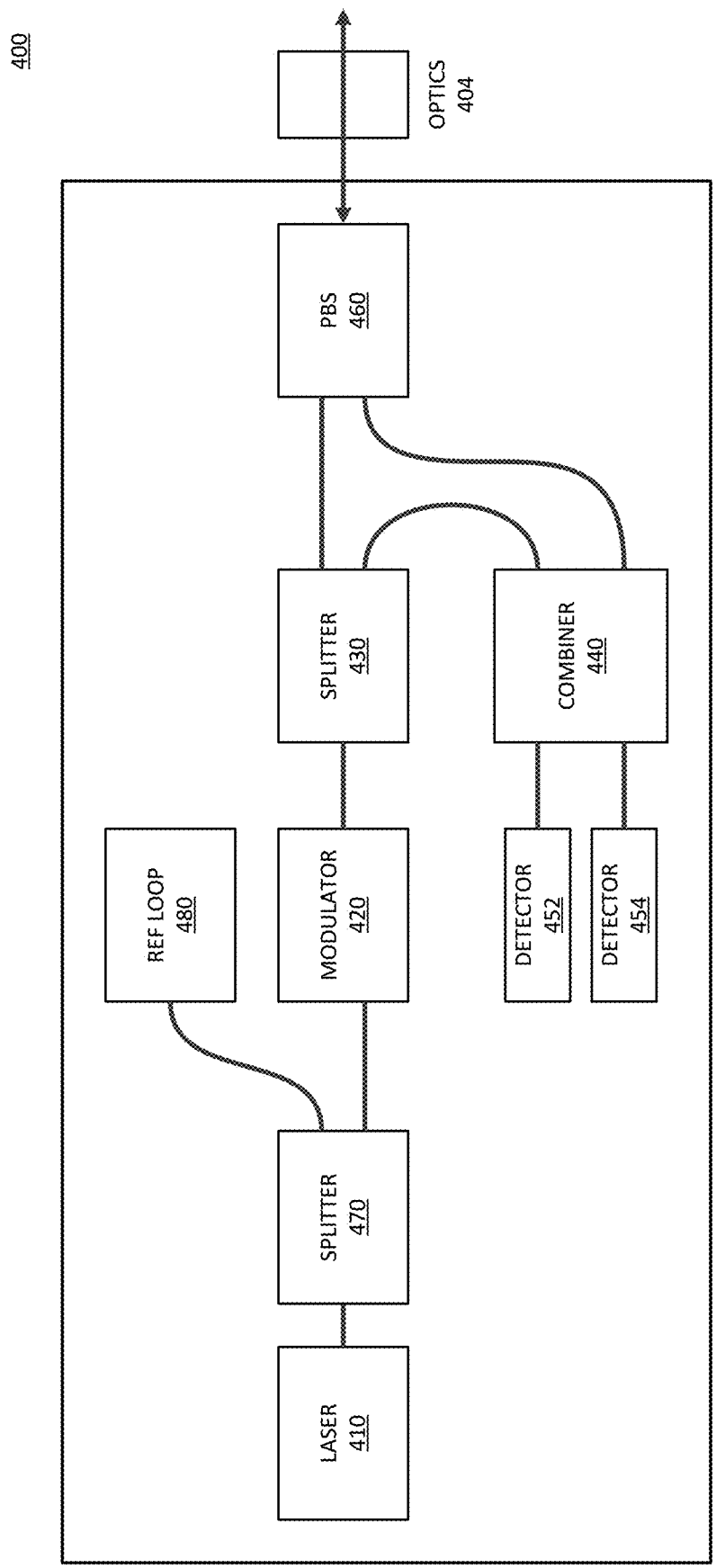
FIG. 4 illustrates an example of a LIDAR system with active modulation and a reference loop to provide a combined FM and AM signal.

FIG. 4 illustrates an example of a LIDAR system with active modulation and a reference loop to provide a combined FM and AM signal. System 400 illustrates a LIDAR system in accordance with embodiments of the present disclosure. System 400 can include separate processing components (not specifically shown).

System 400 includes laser 410, which includes the functionality to produce a light signal that is processed by one or more optical circuit elements of the optical circuitry of circuit 402. Circuit 402 can include modulator 420 to modulate the light signal transmitted from laser 410. In one example, laser 410 is a continuous-wave laser. In one example, modulator 420 is an SOA (semiconductor optical amplifier). The modulation techniques performed by modulator 420 can include FM modulation, AM modulation, or other modulation. In one example, modulator 420 can include an FM modulator to FM modulate the source signal. In one example, modulator 420 includes an amplification component.

In one example, modulator 420 includes one or more active modulator components to provide TOF signal information with the FM modulator signal, to generate a power and frequency modulated signal or FM and AM modulated signal. In one example, the modulation includes amplitude modulation. In one example, the TOF signal information provided by modulator 420 includes an AM signal modulated onto the FM modulated signal. In one example, modulator 420 is an active modulator. The modulator 420 can be or include, for example, a Mach-Zehnder modulator (MZM). The modulator 420 can be or include, for example, an optical attenuator. The modulator 420 can be or include, for example, an optical circuit to AM modulate an optical amplifier gain signal.

An example of system 400 includes reference (REF) loop 480. Thus, the laser signal from laser 410 can be split with splitter 470 into a reference delay loop and a phased-lock loop (PLL) to be linearly chirped. Reference loop 480 can provide a reference source signal prior to modulation of the signal for purposes of combining for processing.

The frequency modulated laser can be fed into modulator 420, which can represent an optical amplifier or power modulator. The power and frequency or AM and FM modulated light can be split to two paths by splitter 430, one for the local oscillator (LO) and one for the transmitter (TX). PBS 460 represents a PBS or circulator followed by other optical elements (integrated or free space optics) to emit the modulated LIDAR signal through free space optics 404. Optics 404 and PBS 460 can couple back the return signal (RX) from the target and combine with the LO using an optical combiner, represented by combiner 440.

Combiner 440 can receive a reference signal from splitter 430 and the reflection signal from PBS 460. Combiner 440 provides the signals to one or more photodetectors, identified as detector 452 and detector 454. Detector 452 and detector 454 can provide the signal information to one or more processing components. Circuit 402 can provide optical signal information to a processor or component for final signal processing.

The processing components, based on the signals from the detectors from circuit 402, can separate an amplitude modulation signal portion and an FM modulation portion. The processing components can extract TOF information from the AM modulation and determine the range and velocity of targets from the FM modulation. The processing components can map targets with a point set with per point information based on the combined AM and FM signal.

The processing components (not specifically shown) receive detected signal information from detector 452 and detector 454 and apply signal processing on the reflection signal to generate a target point set. The processing can include frequency processing to generate target points based on range and Doppler information. The processing can also include TOF processing to provide TOF range information.

Figure 5B:
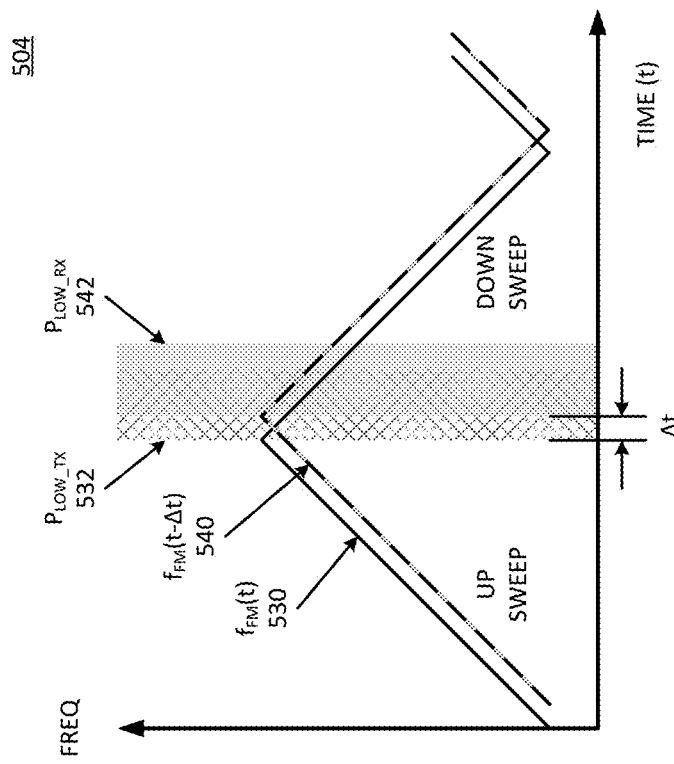
FIG. 5B illustrates an example of a LIDAR signal and its reflection with FM modulation selectively in low power at a beginning of a down sweep.
Figure 5A:
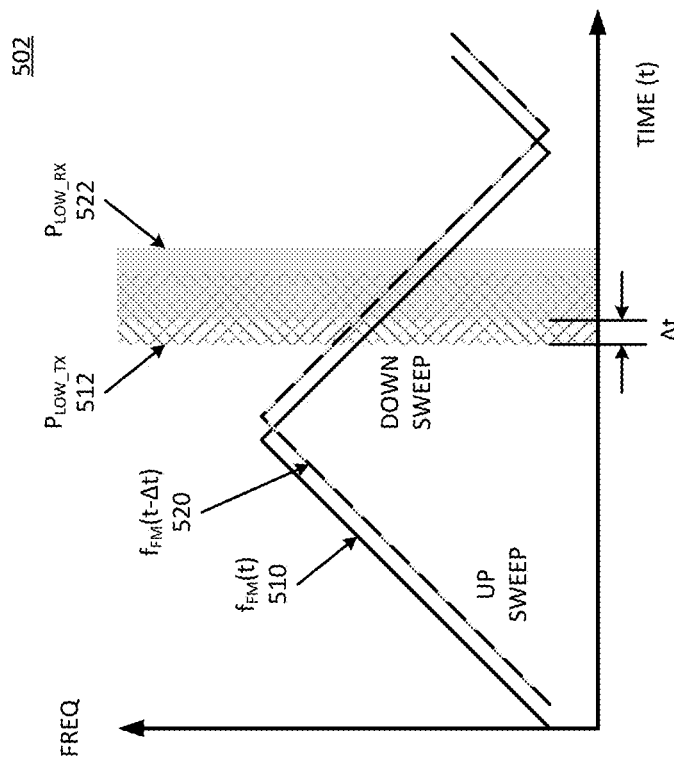
FIG. 5A illustrates an example of a LIDAR signal with FM modulation selectively turned off in the middle of a down sweep.

FIG. 5A illustrates an example of a LIDAR signal with FM modulation selectively turned off in the middle of a down sweep. Diagram 502 represents an example of a signal and the reflection of the signal. Diagram 502 represents signaling in accordance with embodiments of the present disclosure.

The rising frequency (FREQ) over time represents an up sweep of the signal frequency, and the decreasing frequency over time represents a down sweep of the signal frequency. Diagram 502 represents an example of encoding time of flight information by turning off the power of the modulation for a period T_low (time of low modulation power).

Signal 510 represents a transmit or TX signal, identified as $f_{FM}(t)$. Signal 510 is represented as the solid line and has a pattern of up sweep, followed by a down sweep, followed by an up sweep. Signal 520 represents a receive or reflection signal or RX signal, identified as $f_{FM}(t-\Delta t)$, where $\Delta t$ represents the total time of flight for the signal to transmit to the target, and for a reflection to return from the target.

Signal 520 is represented as the dashed line and also has a pattern of up sweep, followed by a down sweep, followed by an up sweep.

In some cases, T_low (e.g., low power or power off) occurs during the sweeps when the laser frequency is in a stable value. An estimate of the range can be obtained using a time domain processing data path including a correlator and a delay estimator to measure Δt. The estimate of range, in combination with frequency domain peaks, leads to a more robust estimate of range and velocity per point.

Time 512, labeled as $P_{LOW\_TX}$, represents the time when the transmit signal modulation has low power. Time 512 occurs during the down sweep. Time 522, labeled as $P_{LOW\_RX}$, represents the time when the reflection signal modulation has low power. The time Δt is the time between the transmit signal being emitted and the reflection signal being received and detected. The processing device can determine Δt by computing the low power time in the RX signal as compared to the low power time in the TX signal.

Thus, in one example, the optical circuitry of a LIDAR device can selectively reduce FM modulation to low power or turn frequency modulation off for a pulse. The pulse of frequency modulation will appear in the receive signal, and correlation of the two signals can identify the time of flight. In one example, as in diagram 502, the frequency modulation can be adjusted to low power for a pulse during a frequency down sweep.

FIG. 5B illustrates an example of a LIDAR signal and its reflection with FM modulation selectively at low power at a beginning of a down sweep. Diagram 504 represents an example of a signal and the reflection of the signal. Diagram 504 represents signaling in accordance with embodiments of the present disclosure.

The rising frequency (FREQ) over time represents an up sweep of the signal frequency, and the decreasing frequency over time represents a down sweep of the signal frequency. Diagram 504 represents an example of encoding time of flight information by turning off the power of the modulation for a period T_low (time of low modulation power).

Signal 530 represents a transmit or TX signal, identified as $f_{FM}(t)$. Signal 530 is represented as the solid line and has a pattern of up sweep, followed by a down sweep, followed by an up sweep. Signal 540 represents a receive or reflection signal or RX signal, identified as $f_{FM}(t-\Delta t)$, where Δt represents the total time of flight for the signal to transmit to the target, and for a reflection to return from the target. Signal 540 is represented as the dashed line and also has a pattern of up sweep, followed by a down sweep, followed by an up sweep.

In some cases, T_low occurs in between the sweeps when the laser frequency is in transition. As illustrated, T_low occurs at the transition between up sweep and down sweep. An estimate of the range can be obtained using a time domain processing data path including a correlator and a delay estimator to measure ΔT. The estimate of range, in combination with frequency domain peaks, leads to a more robust estimate of range and velocity per point.

Time 532, labeled as $P_{LOW\_TX}$, represents the time when the transmit signal modulation has low power or the modulation power is off. Time 532 occurs during a transition from up sweep to down sweep. Time 542, labeled as $P_{LOW\_RX}$, represents the time when the reflection signal modulation has low power or the modulation power is off. The time Δt is the time between the transmit signal being emitted and the reflection signal being received and detected. The processing device can determine Δt by computing the low power time in the RX signal as compared to the low power time in the TX signal.

Thus, in one example, the optical circuitry of a LIDAR device can selectively adjust FM modulation to low power or turn frequency modulation off for a pulse. The pulse of frequency modulation will appear in the receive signal, and correlation of the two signals can identify the time of flight. In one example, as in diagram 504, the frequency modulation can be adjusted to low power for a pulse at a beginning of a transition from frequency up sweep to frequency down sweep.

Figure 6:
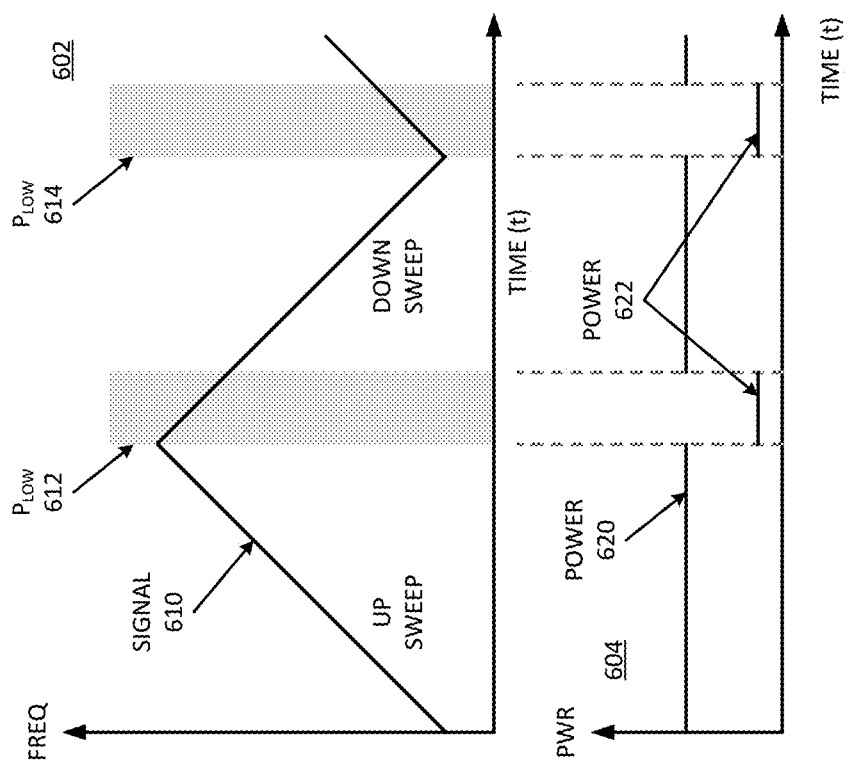
FIG. 6 illustrates an example of a LIDAR signal selectively in low power at the beginning of a down sweep and a beginning of an up sweep.

FIG. 6 illustrates an example of a LIDAR signal selectively in low power at the beginning of a down sweep and a beginning of an up sweep. Diagram 602 represents an example of a signal and the reflection of the signal. Diagram 602 represents signaling in accordance with embodiments of the present disclosure.

The rising frequency (FREQ) over time represents an up sweep of the signal frequency, and the decreasing frequency over time represents a down sweep of the signal frequency. Diagram 602 represents an example of encoding time of flight information by turning off the power of the modulation for a period T_low (time of low modulation power). The period is a section of the sweep signal.

Signal 610 represents a transmit or TX signal. In some cases, T_low occurs in between the sweeps when the laser frequency is in transition. As illustrated, T_low occurs at the transition between up sweep (or upsweep or upsweep signal) and down sweep (or downsweep or downsweep signal) and at the transition between down sweep and up sweep.

Time 612, labeled as $P_{LOW}$, represents the time when the transmit signal modulation has low power at a transition between up sweep and down sweep. Time 614, also labeled as $P_{LOW}$, represents the time when the reflection signal modulation has low power at a transition between down sweep and up sweep.

Thus, in one example, the optical circuitry of a LIDAR device can selectively turn FM modulation to low power or turn frequency modulation off for a pulse. The pulse of frequency modulation will appear in the receive signal, and correlation of the two signals can identify the time of flight. In one example, as in diagram 602, the frequency modulation can be adjusted to low power for a pulse at a beginning of a transition from frequency up sweep to frequency down sweep and from a transition from frequency down sweep to frequency up sweep.

Diagram 604 illustrates the power or AM signal for the signal of diagram 602. The power can be observed to be in low power when the modulation is at low modulation power. Thus, power 620 represents the modulation signal power modulated onto the carrier light signal. Power 622 represents the $P_{LOW}$ times.

Figure 7:
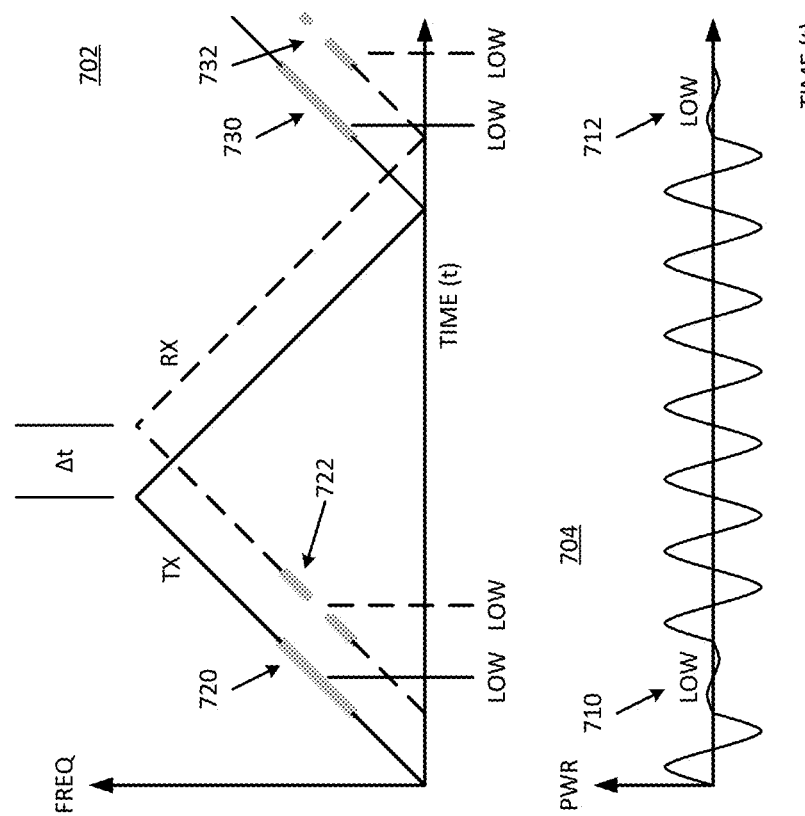
FIG. 7 illustrates an example of modulation signals for on/off modulation.

FIG. 7 illustrates an example of modulation signals for on/off modulation. On/off modulation refers to modulation that changes from a baseline modulation power to a low modulation power state or the modulation power is reduced (which may be reduced all the way to zero power). Diagram 702 represents an example of a signal (TX) and the reflection (RX) of the signal. Diagram 702 represents time of flight signaling by way of selectively reducing modulation power for a period or by turning modulation frequency off.

The solid triangle signal represents the transmit signal TX. The TX signal has a T_low at 720 in the up sweep of the TX signal, and has a T_low at 730 in the next up sweep of the TX signal. The dashed line triangle signal represents the reflection signal RX. The RX signal has a T_low period at 722 corresponding to the T_low at 720 in the TX signal. The RX signal has a T_low period 732 corresponding to the T_low at 730 in the TX signal. The period ΔT is represented as the time between the TX T_low and the RX T_low.

Diagram 704 provides a representation of the modulation signal of diagram 702. In diagram 702, the T_low time at 710 corresponds to T_low time 720 of the TX signal. Similarly, the T_low time at 712 corresponds to T_low time 730 of the TX signal. As the beam comes back from the target, the T_low will be offset in time (ΔT) with a value corresponding to the range of the object. Measuring the total time of flight TToF (ΔT) provides a range measurement that is not a function of Doppler, while the beat frequency from the frequency modulated signal is a function of Range and Doppler. Combining the information of the TToF and beat frequency allows for range and doppler calculation within a single measurement.

The selective transitioning between the baseline modulation power and the low power modulation (at T_low) can be referred to as a low power mode. An active modulator can have a low power mode to enable transitioning between normal power operation and low power operation or turning off modulation power. The low power mode provides lower power in the FM modulation to generate a TOF information detectable in a return beam that reflects off a target or target environment that is scanned with the optical beam. The optical light source can provide FM modulation and the low-power mode can provide time of flight information. The LIDAR system can provide a first portion of the light signal for a sweep signal to generate a pulsed light transmitted toward the target, and a second portion of the light signal for a local oscillator. The first and second portions of the light signal can be detected from the return beam, enabling detection of range and velocity from a single optical beam.

Figure 8:
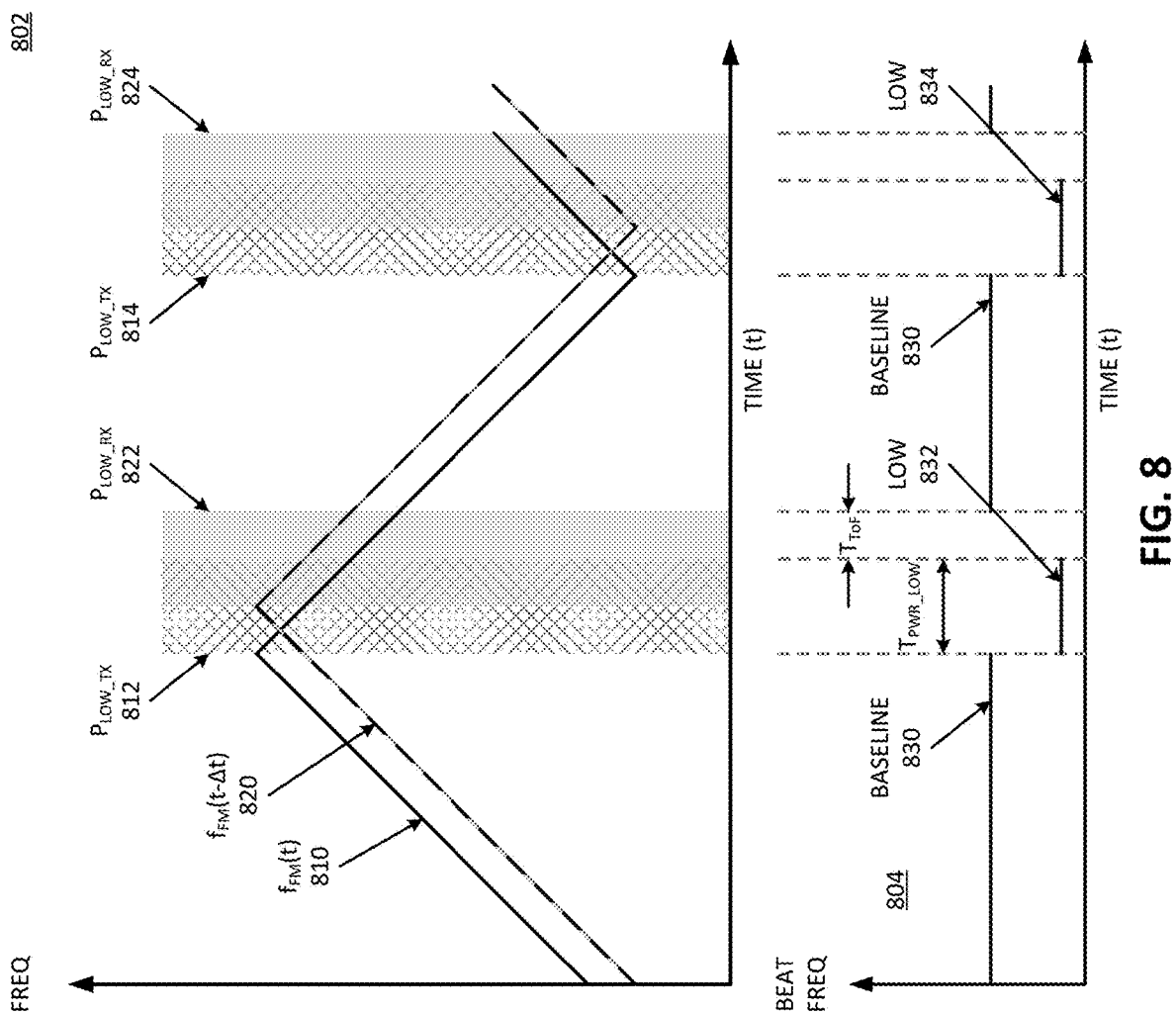
FIG. 8 illustrates an example of a LIDAR signal and its reflection for a LIDAR signal selectively in low power at the beginning of a down sweep and a beginning of an up sweep.

FIG. 8 illustrates an example of a LIDAR signal and its reflection for a LIDAR signal selectively set to low power at the beginning of a down sweep and a beginning of an up sweep. Diagram 802 represents an example of a signal and the reflection of the signal. Diagram 802 represents signaling in accordance with an embodiments of the present disclosure.

The rising frequency (FREQ) over time represents an up sweep of the signal frequency, and the decreasing frequency over time represents a down sweep of the signal frequency. Diagram 802 represents an example of encoding time of flight information by turning the power of the modulation to lower power for a period T_low (time of low modulation power).

Signal 810 represents a transmit or TX signal, identified as $f_{FM}(t)$. Signal 810 is represented as the solid line and has a pattern of up sweep, followed by a down sweep, followed by an up sweep. Signal 820 represents a receive or reflection signal or RX signal, identified as $f_{FM}(t-\Delta t)$, where Δt represents the total time of flight for the signal to transmit to the target, and for a reflection to return from the target. Signal 820 is represented as the dashed line and also has a pattern of up sweep, followed by a down sweep, followed by an up sweep.

In some cases, T_low occurs in between the sweeps when the laser frequency is in transition. As illustrated, T_low occurs at the transition between up sweep and down sweep and at the transition between down sweep and up sweep. Time 812, labeled as $P_{LOW\_TX}$, represents the time when the transmit signal modulation has low power or the power is zero or off at a transition between up sweep and down sweep. Time 822, labeled as $P_{LOW\_RX}$, represents the time when the reflection signal modulation has low power or the power is zero or off.

Time 814, labeled as $P_{LOW\_TX}$, represents the time when the transmit signal modulation has low power at a transition between down sweep and up sweep. Time 814 occurs during a transition from up sweep to down sweep. Time 824, labeled as $P_{LOW\_RX}$, represents the time when the reflection signal modulation has low power for the transition of the TX signal between down sweep and up sweep.

The time $T_{TOF}$ is the Δt, or the time between the transmit signal being emitted and the reflection signal being received and detected. The processing device can determine Δt by computing the low power time in the RX signal as compared to the low power time in the TX signal.

In some cases, T_low occurs in between the sweeps when the laser frequency is in transition. As illustrated, T_low occurs at the transition between up sweep and down sweep and at the transition between down sweep and up sweep. An estimate of the range can be obtained using a time domain processing data path including a correlator and a delay estimator to measure ΔT. The estimate of range, in combination with frequency domain peaks, leads to a more robust estimate of range and velocity per point.

Diagram 804 illustrates the power or AM signal for the signal of diagram 802. The response amplitude of the beat frequency can be observed to go low in response to the modulation going to low power, and is identified as $T_{PWR\_LOW}$. Baseline 830 represents the modulation signal power modulated onto the carrier light signal. Zero 832 represents the $P_{LOW}$ time for the transition between up sweep and down sweep. Zero 834 represents the $P_{LOW}$ time for the transition between down sweep and up sweep.

Figure 9:
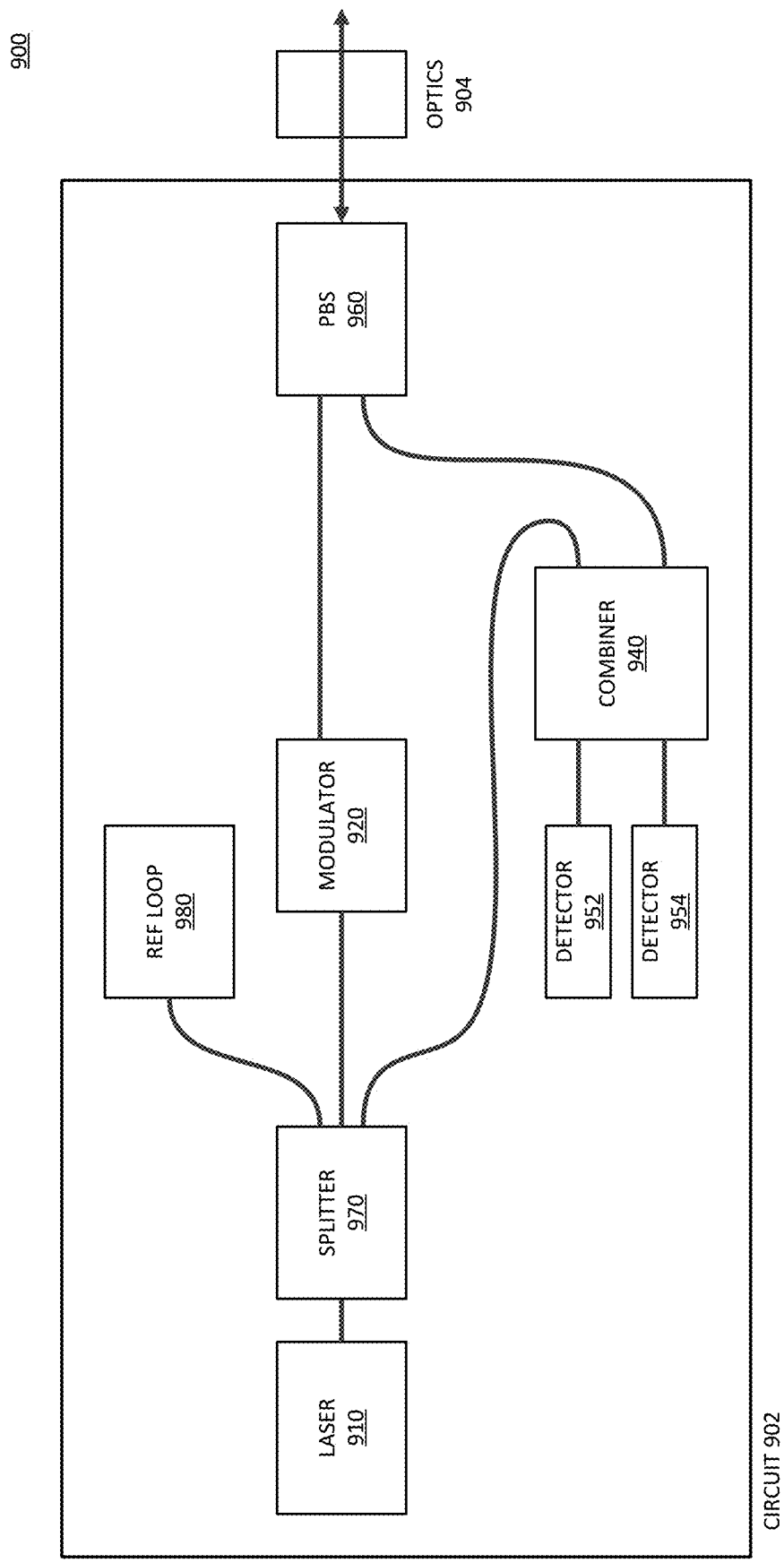
FIG. 9 illustrates an example of a LIDAR system with active modulation to provide a combined FM and AM signal on a transmit path.

FIG. 9 illustrates an example of a LIDAR system with active modulation to provide a combined FM and AM signal on a transmit path. System 900 illustrates a LIDAR system in accordance with embodiments of the present disclosure. System 900 can include separate processing components (not specifically shown).

System 900 illustrates laser 910, which includes the functionality to produce a light signal that is processed by one or more optical circuit elements of the optical circuitry of circuit 902. Circuit 902 can include modulator 920 to modulate the light signal transmitted from laser 910. In one example, laser 910 is a continuous-wave laser. In one example, modulator 920 is an SOA (semiconductor optical amplifier). The modulation techniques performed by modulator 920 can include FM modulation, AM modulation, or other modulation. In one example, modulator 920 can include an FM modulator to FM modulate the source signal. In one example, modulator 920 includes an amplification component.

In one example, modulator 920 includes one or more active modulator components to provide TOF signal information with the FM modulator signal, to generate a power and frequency modulated signal or FM and AM modulated signal. In one example, the modulation includes amplitude modulation. In one example, the TOF signal information provided by modulator 920 includes an AM signal modulated onto the FM modulated signal. In one example, modulator 920 is an active modulator. The active modulator can be or include, for example, a Mach-Zehnder modulator (MZM). The active modulator can be or include, for example, an optical attenuator. The active modulator can be or include, for example, an optical circuit to AM modulate an optical amplifier gain signal. The frequency modulated laser can be fed into modulator 920, which can represent an optical amplifier or power modulator.

An example of system 900 includes reference (REF) loop 980. Thus, the laser signal from laser 910 can be split with splitter 970 into a reference delay loop and a phased-lock loop (PLL) to be linearly chirped. Reference loop 980 can provide a reference source signal prior to modulation of the signal for purposes of combining for processing.

In some scenarios, only the TX signal is power modulated. In this case the TTOF can be calculated from the electrical signal on the MZM or OA and the TPower low of a received (RX) signal. As illustrated in system 900, only the TX power is modulated and the LO signal is received from splitter 970 after laser 910, without being modulated by modulator 920. Modulator 920 thus only modulates the transmit path, with the LO path splitting off before the modulation. In such a case, the TOF delay can be measured by clocking the input electrical signal into the modulator and received signal.

The power and frequency or AM and FM modulated light can be sent to PBS 960, which represents a PBS or circulator followed by other optical elements (integrated or free space optics) to emit the modulated LIDAR signal through free space optics 904. Optics 904 and PBS 960 can couple back the return signal (RX) from the target and combine with the LO using an optical combiner, represented by combiner 940. Combiner 940 can receive a reference signal from splitter 970 and the reflection signal from PBS 960. Combiner 940 provides the signals to one or more photodetectors, identified as detector 952 and detector 954. Detector 952 and detector 954 can provide the signal information to one or more processing components. Circuit 902 can provide optical signal information to a processor or component for final signal processing.

The processing components, based on the signals from the detectors from circuit 902, can extract amplitude modulation or TOF information from FM modulation and determine the range and velocity of targets identified in the scanning. The processing components can map targets with a point set with per point information based on the combined AM and FM signal.

The processing components (not specifically shown) receive detected signal information from detector 952 and detector 954 and apply signal processing on the reflection signal to generate a target point set. The processing can include frequency processing to generate target points based on range and Doppler information. The processing can also include TOF processing to provide TOF range information.

Figure 10:
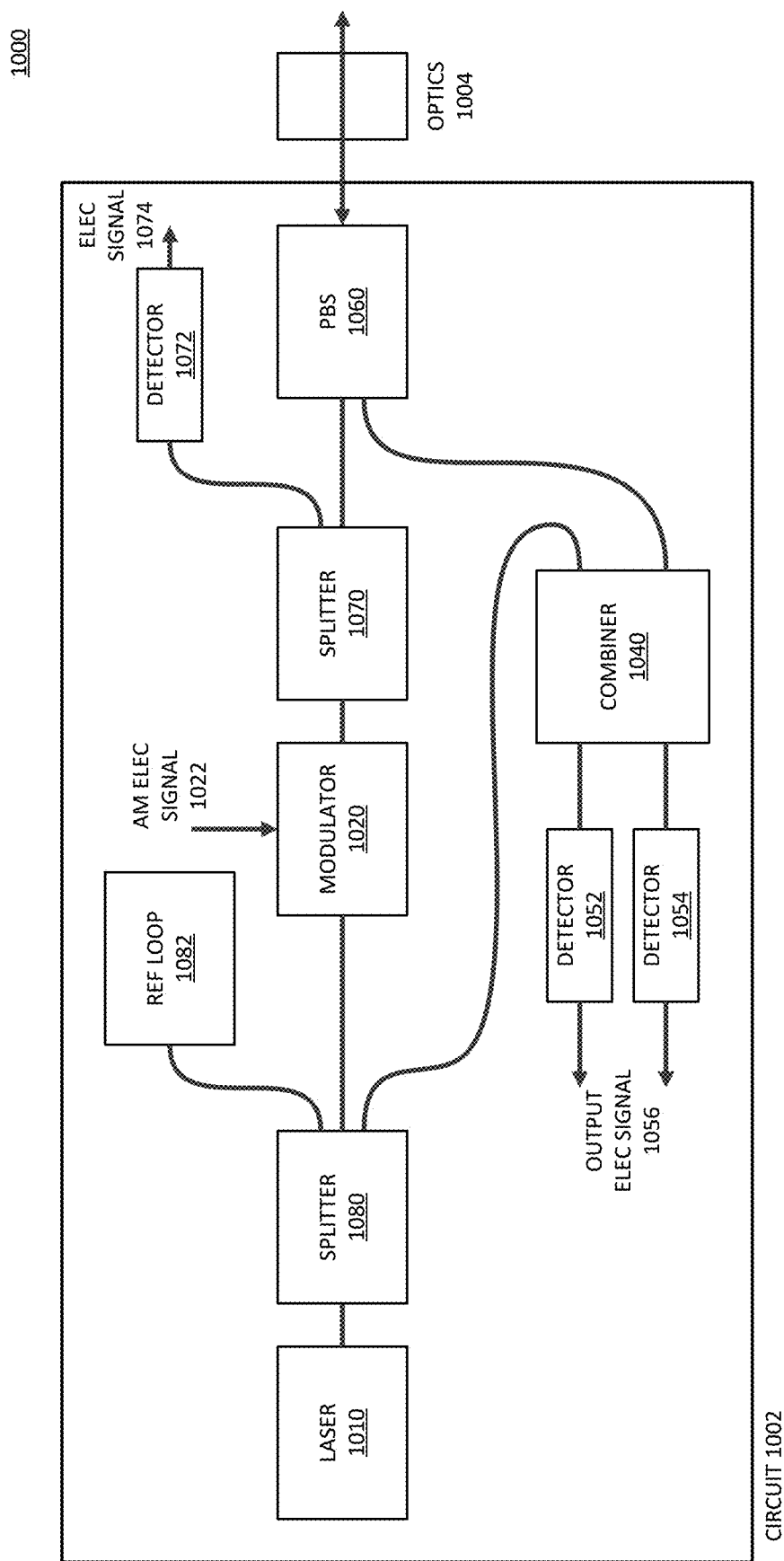
FIG. 10 illustrates an example of a LIDAR system with active modulation to provide a combined FM and AM signal on a transmit path with a reference detector.

FIG. 10 illustrates an example of a LIDAR system with active modulation to provide a combined FM and AM signal on a transmit path with a reference detector. System 1000 illustrates a LIDAR system in accordance with embodiments of the present disclosure. System 1000 can include separate processing components (not specifically shown).

System 1000 includes laser 1010, which includes functionality to produce a light signal that is processed by one or more optical circuit elements of the optical circuitry of circuit 1002. Circuit 1002 can include modulator 1020 to modulate the light signal transmitted from laser 1010. In one example, laser 1010 is a continuous-wave laser. In one example, modulator 1020 is an SOA (semiconductor optical amplifier). The modulation techniques performed by modulator 1020 can include FM modulation, AM modulation, or other modulation, modulator 1020 can include an FM modulator to FM modulate the source signal. In one example, modulator 1020 includes an amplification component.

In one example, modulator 1020 includes one or more active modulator components to provide TOF signal information with the FM modulator signal, to generate a power and frequency modulated signal or FM and AM modulated signal. In one example, the modulation includes amplitude modulation. In one example, the TOF signal information provided by modulator 1020 includes an AM signal modulated onto the FM modulated signal. In one example, modulator 1020 is an active modulator. The active modulator can be or include, for example, a Mach-Zehnder modulator (MZM). The active modulator can be or include, for example, an optical attenuator. The active modulator can be or include, for example, an optical circuit to AM modulate an optical amplifier gain signal. The frequency modulated laser can be fed into modulator 1020, which can represent an optical amplifier or power modulator.

An example of system 1000 includes reference (REF) loop 1082. Thus, the laser signal from laser 1010 can be split with splitter 1080 into a reference delay loop and a phased-lock loop (PLL) to be linearly chirped. Reference loop 1082 can provide a reference source signal prior to modulation of the signal for purposes of combining for processing.

In some scenarios, only the TX signal is power modulated. In this case the TTOF can be calculated from the electrical signal on the MZM or OA and the TPower low of a received (RX) signal. As illustrated in system 1000, only the TX power is modulated and the LO signal is received from splitter 1080 after laser 1010, without being modulated by modulator 1020. Modulator 1020 thus only modulates the transmit path, with the LO path splitting off before the modulation. In such a case, the TOF delay can be measured by clocking the input electrical signal into the modulator and received signal.

The power and frequency or AM and FM modulated light can be sent to PBS 1060, which represents a PBS or circulator followed by other optical elements (integrated or free space optics) to emit the modulated LIDAR signal through free space optics 1004. Optics 1004 and PBS 1060 can couple back the return signal (RX) from the target and combine with the LO using an optical combiner, represented by combiner 1040. Combiner 1040 can receive a reference signal from splitter 1080 and the reflection signal from PBS 1060. Combiner 1040 provides the signals to one or more photodetectors, identified as detector 1052 and detector 1054. Detector 1052 and detector 1054 can provide the signal information to one or more processing components. Circuit 1002 can provide optical signal information to a processor or component for final signal processing.

An example of system 1000 includes splitter 1070 to split the power and frequency modulated signal in the transmit path to PBS 1060 and to detector 1072. As illustrated in circuit 1002, modulator 1020 can receive AM electrical (ELEC) signal 1022 as a signal to provide onto the frequency modulated light signal. Detector 1072 generates electrical (ELEC) signal 1074 that can be used as a reference by the processing components. Detector 1052 and detector 1054 also generate output electrical (ELEC) signals 1056 to be processed by the processing components.

The processing components, based on the signals from the detectors from circuit 1002, can extract amplitude modulation or TOF information from FM modulation and determine the range and velocity of targets identified in the scanning. The processing components can map targets with a point set with per point information based on the combined AM and FM signal.

The processing components (not specifically shown) receive detected signal information from detector 1052, detector 1054, and detector 1072 and apply signal processing on the reflection signal to generate a target point set. The processing can include frequency processing to generate target points based on range and Doppler information. The processing can also include TOF processing to provide TOF range information.

FIG. 11A illustrates an example of an AM signal with on/off modulation with local oscillator and transmit paths modulated. Diagram 1102 illustrates an AM signal with on/off modulation with both the transmit path (TX) and the local oscillator path (LO) modulated. Diagram 1102 illustrates the sweep duration with signal pulses generated by applying periods of low power frequency modulation. Signal 1110 represents the AM signal. T_low LO 1120 represents the signal fed to the combiner from the internal optical circuits, and T_low_RX 1130 represents the reflection signal received at the combiner after a time Delta_T later.

FIG. 11B illustrates an example an of AM signal with a modulation waveform with local oscillator and transmit paths modulated. Diagram 1104 illustrates an AM signal with an AM modulation waveform with LO and TX modulated. Diagram 1104 represents the signal detection in the RX path of the TX signal of diagram 1102. Signal curve 1150 represents the TX modulation waveform. Signal curve 1140 represents the AM signal obtained by combining the received signal (RX waveform) with the local oscillator signal (RX*LO).

Figure 12A:
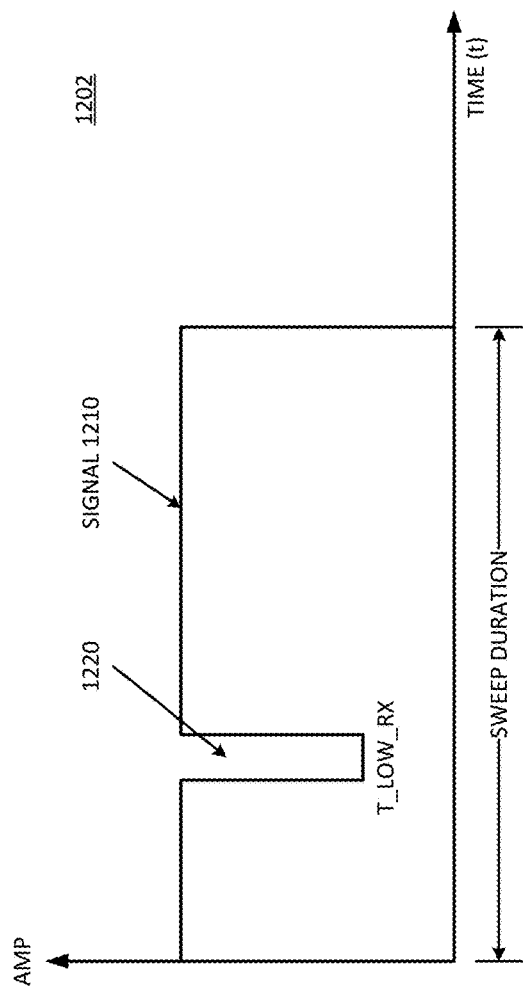
FIG. 12A illustrates an example of an AM signal with on/off modulation with only a transmit path modulated.

FIG. 12A illustrates an example of an AM signal with on/off modulation with only a transmit path modulated. Diagram 1202 illustrates an AM signal with on/off modulation with only the transmit path (TX) modulated. Diagram 1202 illustrates the sweep duration with a signal pulse generated by applying periods of low power frequency modulation. Signal 1210 represents the AM signal. T_low_RX 1220 represents the reflection signal received at the combiner.

Figure 12B:
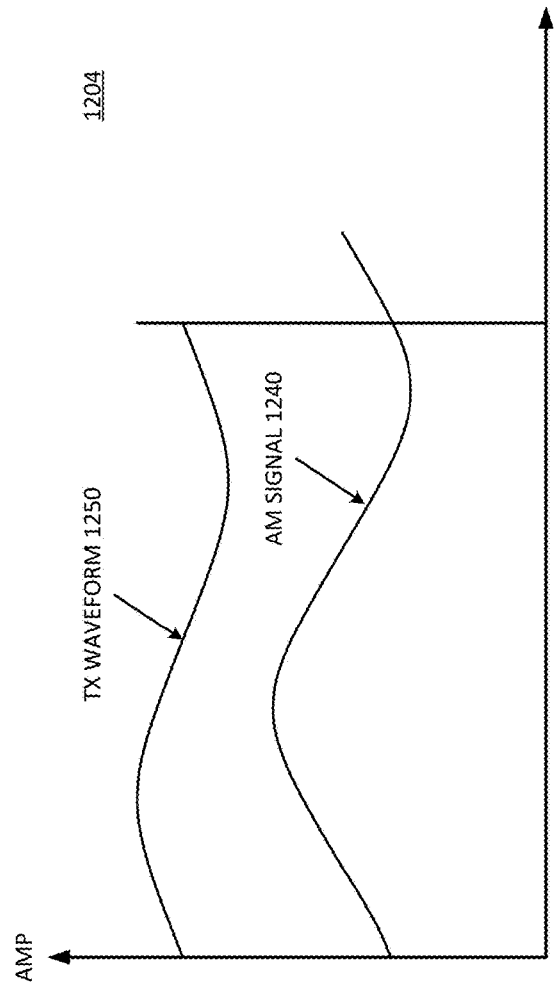
FIG. 12B illustrates an example of an AM signal with a modulation waveform with only a transmit path modulated.

FIG. 12B illustrates an example of an AM signal with a modulation waveform with only a transmit path modulated. Diagram 1204 illustrates an AM signal with an AM modulation waveform with only TX modulated. Diagram 1204 represents the signal detection in the RX path of the TX signal of diagram 1202. Signal curve 1250 represents the TX modulation waveform. Signal curve 1240 represents the AM signal obtained from the received signal (RX waveform).

Figure 13:
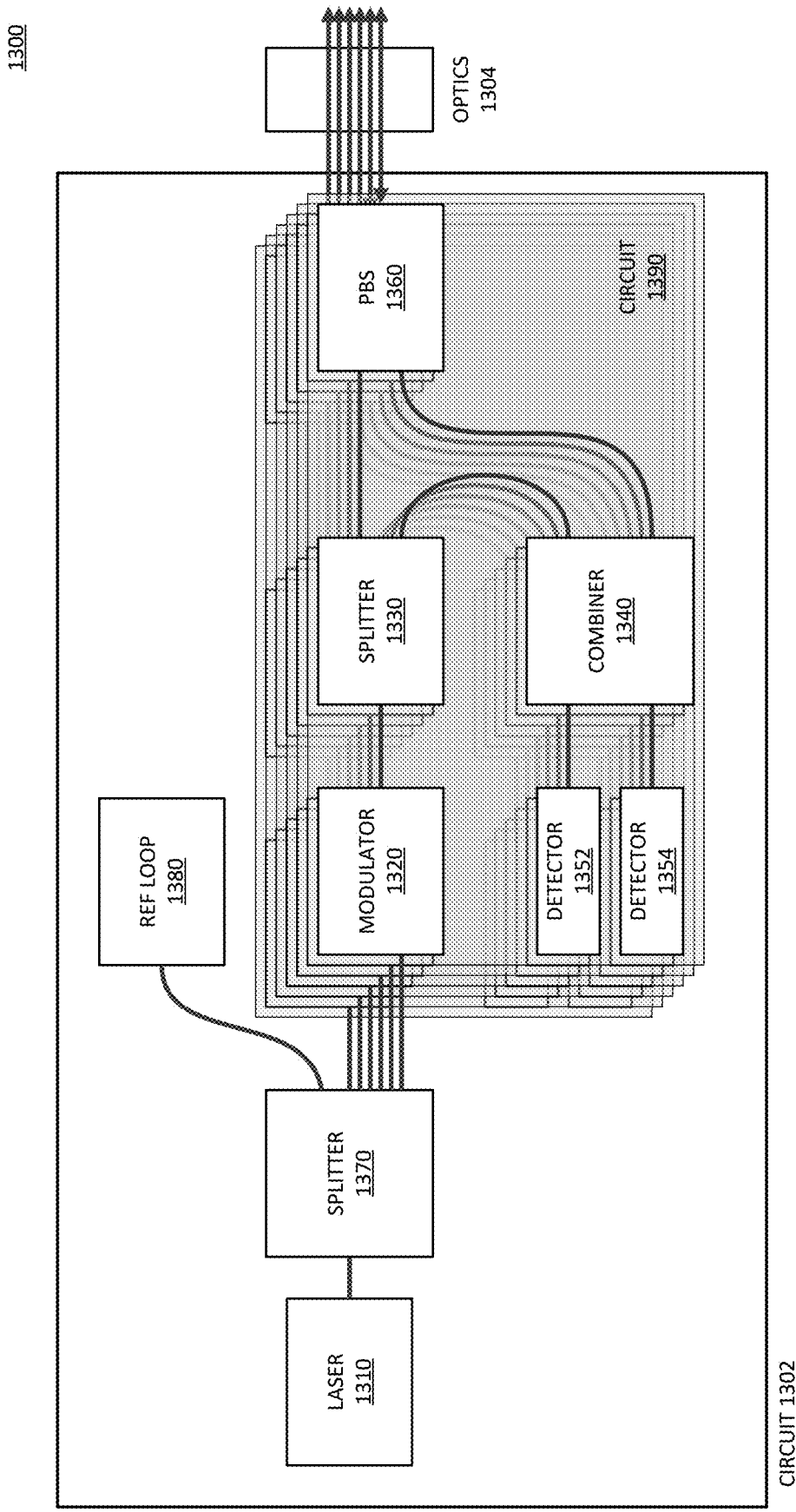
FIG. 13 illustrates an example of a LIDAR system with active AM modulation for a multipath system.

FIG. 13 illustrates an example of a LIDAR system with active AM modulation for a multipath system. System 1300 illustrates a LIDAR system in accordance with embodiments of the present disclosure. System 1300 represents multiple instances of components in accordance with an example of system 400. It will be understood that the use of multiple beams can be implemented for any instance of optical circuit described, and for simplicity, only the configuration of multiple optical circuits in accordance with system 400 is illustrated. The modulation for multiple beams can be performed with passive or with active modulation components.

System 1300 can include separate processing components (not specifically shown). System 1300 includes laser 1310, which includes the functionality to produce a light signal that is processed by multiple optical circuits 1390 of the optical circuitry of circuit 1302.

Each optical circuit 1390 can include modulator 1320 to modulate the source signal transmitted from laser 1310. In one example, laser 1310 is a continuous-wave laser. In one example, modulator 1320 is an SOA (semiconductor optical amplifier). The modulation techniques performed by modulator 1320 can include FM modulation, AM modulation, or other modulation. In one example, modulator 1320 can include an FM modulator to FM modulate the source signal. In one example, modulator 1320 includes an amplification component.

In one example, modulator 1320 includes one or more active modulator components to provide TOF signal information with the FM modulator signal, to generate a power and frequency modulated signal or FM and AM modulated signal. In one example, the modulation includes amplitude modulation. In one example, the TOF signal information provided by modulator 1320 includes an AM signal modulated onto the FM modulated signal. In one example, modulator 1320 is an active modulator. The active modulator can be or include, for example, a Mach-Zehnder modulator (MZM). The active modulator can be or include, for example, an optical attenuator. The active modulator can be or include, for example, an optical circuit to AM modulate an optical amplifier gain signal.

An example of system 1300 includes reference (REF) loop 1380. Reference loop 1380 can be common to all circuits 1390. The laser signal from laser 1310 can be split with splitter 1370 into a reference delay loop and a phased-lock loop (PLL) to be linearly chirped. Reference loop 1380 can provide a reference source signal prior to modulation of the signal for purposes of combining for processing. The splitter taps off the laser light signal to the reference loop and to multiple beamforming and receiver/detector circuits.

The frequency modulated laser can be fed into modulator 1320, which can represent an optical amplifier or power modulator. The power and frequency or AM and FM modulated light can be split to two paths by splitter 1330, one for the local oscillator (LO) and one for the transmitter (TX). PBS 1360 represents a PBS or circulator followed by other optical elements (integrated or free space optics) to emit the modulated LIDAR signal through free space optics 1304. Optics 1304 and PBS 1360 can couple back the return signal (RX) from the target and combine with the LO using an optical combiner, represented by combiner 1340.

Combiner 1340 can receive a reference signal from splitter 1330 and the reflection signal from PBS 1360. Combiner 1340 provides the signals to one or more photodetectors, identified as detector 1352 and detector 1354. Detector 1352 and detector 1354 can provide the signal information to one or more processing components. Circuit 1302 can provide optical signal information to a processor or component for final signal processing.

The processing components, based on the signals from the detectors from circuit 1302, can extract amplitude modulation or TOF information from FM modulation and determine the range and velocity of targets identified in the scanning. The processing components can map targets with a point set with per point information based on the combined AM and FM signal. In one example, the same processing components can be used for parallel signal processing for the parallel optical circuits 1390.

The processing components (not specifically shown) receive detected signal information from detector 1352 and detector 1354 and apply signal processing on the reflection signal to generate a target point set. The processing can include frequency processing to generate target points based on range and Doppler information. The processing can also include TOF processing to provide TOF range information.

A multiple beam circuit can include a single laser and reference loop, with common optics for the multiple beams. The use of multiple transmit and receive/detection circuits can allow different beam steering and sweeping of different areas. In one example, the various transmit and receive paths provided by circuits 1390 can be integrated onto the same integrated circuit or chip. In one example, the various transmit and receive paths of circuits 1390 can be implemented as discrete components combined in parallel with common source and reference signals. In one example, different instances of optical circuits 1390 can implement different types of modulation. Thus, multiple beams can combine any example of active or passive modulation structures.

In addition to multiple beams, or alternatively to multiple beams, different LIDAR systems can be used in parallel. For example, lasers having different wavelengths can be used in parallel to perform sensing of a target.

Figure 14:
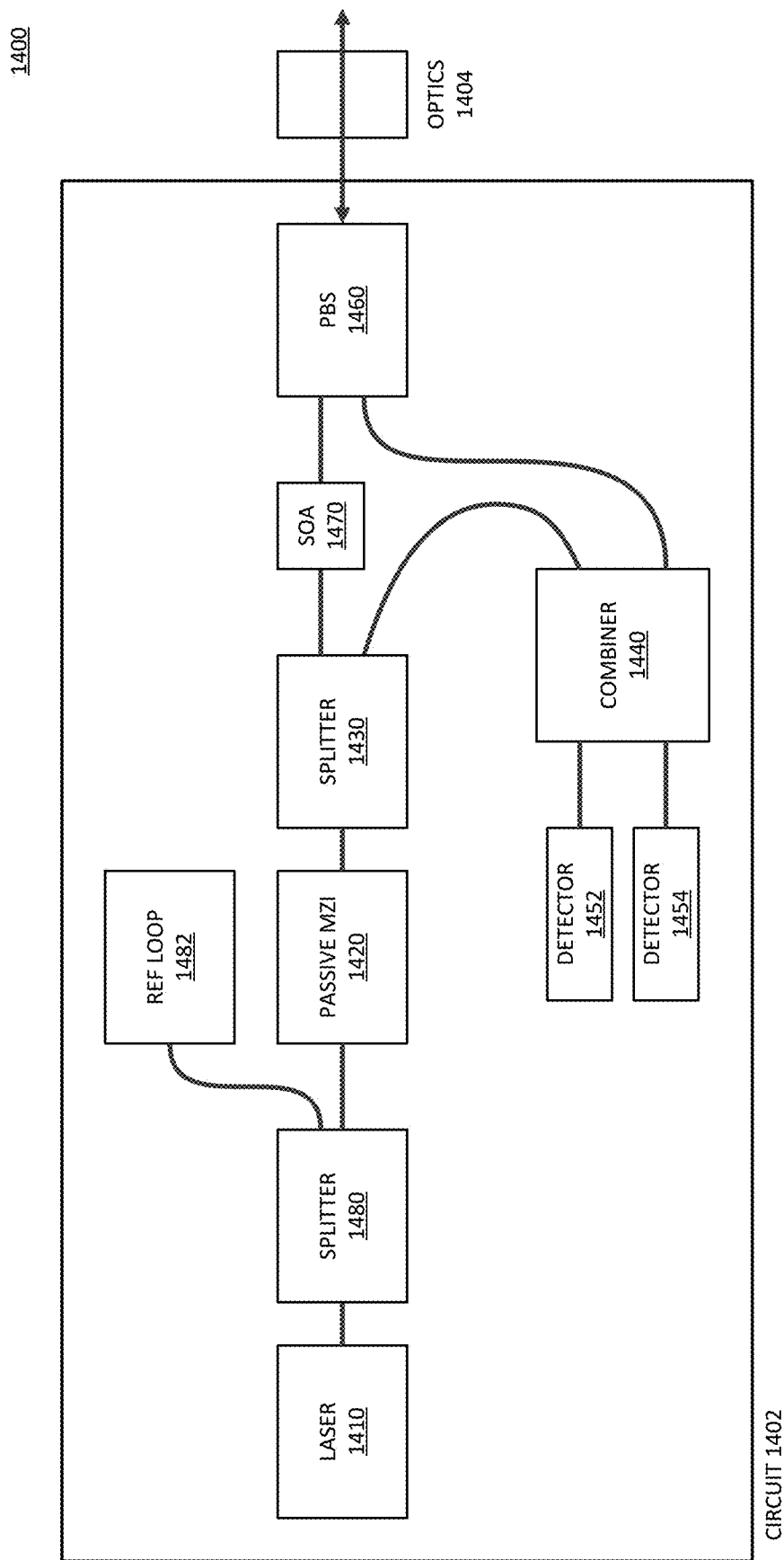
FIG. 14 illustrates an example of a LIDAR system with passive modulation to provide a combined FM and AM signal.

FIG. 14 illustrates an example of a LIDAR system with passive modulation to provide a combined FM and AM signal. System 1400 illustrates a LIDAR system in accordance with embodiments of the present disclosure. System 1400 can include separate processing components (not specifically shown).

System 1400 includes laser 1410, which includes the functionality to produce a light signal that is processed by one or more optical circuit elements of the optical circuitry of circuit 1402. Circuit 1402 can include passive MZI 1420 to modulate the light signal transmitted from laser 1410. While represented as passive MZI, it will be understood that passive MZI 1420 can generally represent a passive modulator. In one example, laser 1410 is a continuous-wave laser. In one example, circuit 1402 includes a modulator to FM modulate the optical signal. In one example, the optical signal is generated with FM modulation by laser 1410. In one example, passive MZI 1420 includes one or more passive modulator components to encode the FM modulated signal with an AM signal, to generate an FM and AM modulated signal or AM and FM modulated signal.

An example of system 1400 includes reference (REF) loop 1482. Thus, the laser signal from laser 1410 can be split with splitter 1480 into a reference delay loop and a phased-lock loop (PLL) to be linearly chirped. Reference loop 1482 can provide a reference source signal prior to modulation of the signal for purposes of combining for processing.

The frequency modulated laser can be fed into passive MZI 1420, which can represent passive modulation for circuit 1402. The AM and FM modulated light can be split to two paths by splitter 1430, one for the local oscillator (LO) and one for the transmitter (TX). PBS 1460 represents a PBS or circulator followed by other optical elements (integrated or free space optics) to emit the modulated LIDAR signal through free space optics 1404. Optics 1404 and PBS 1460 can couple back the return signal (RX) from the target and combine with the LO using an optical combiner, represented by combiner 1440.

In one example, passive MZI 1420 does not perform amplification of the signal. SOA (semiconductor optical amplifier) 1470 can provide optical amplification for the signal in the transmit path. Splitter 1430 can provide the AM and FM modulated signal to SOA 1470 for amplification, and SOA 1470 can provide the amplified signal to PBS 1460 to be emitted through optics 1404.

Combiner 1440 can receive a reference signal from splitter 1430 and the reflection signal from PBS 1460. Splitter 1430 can provide the FM and AM modulated signal as a local oscillator (LO) signal for processing by detector 1452 and detector 1454. Combiner 1440 provides the signals to one or more photodetectors, identified as detector 1452 and detector 1454. Detector 1452 and detector 1454 can provide the signal information to one or more processing components. Circuit 1402 can provide optical signal information to a processor or component for final signal processing.

The processing components, based on the signals from the detectors from circuit 1402, can extract AM information from FM modulation and determine the range and velocity of targets identified in the scanning. The processing components can map targets with a point set with per point information based on the combined AM and FM signal.

The processing components (not specifically shown) receive detected signal information from detector 1452 and detector 1454 and apply signal processing on the reflection signal to generate a target point set. The processing can include frequency processing to generate target points based on range and Doppler information. The processing can also include TOF processing to provide TOF range information based on the AM modulation of the reflection signal.

Figure 15:
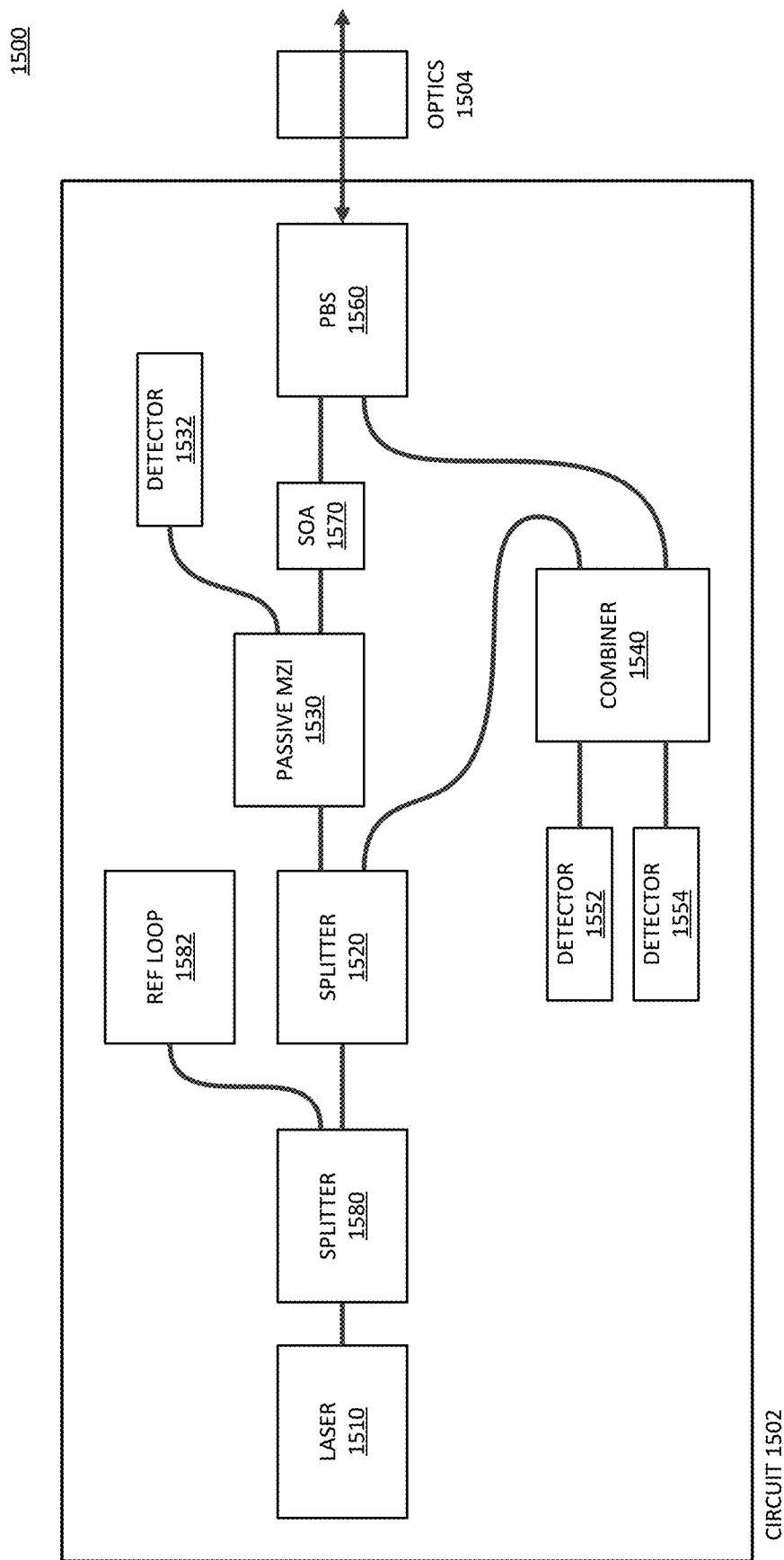
FIG. 15 illustrates an example of a LIDAR system with passive modulation to provide a combined FM and AM signal on a transmit path with a reference detector.

FIG. 15 illustrates an example of a LIDAR system with passive modulation to provide a combined FM and AM signal on a transmit path with a reference detector. System 1500 illustrates a LIDAR system in accordance with embodiments of the present disclosure. System 1500 can include separate processing components (not specifically shown).

System 1500 includes laser 1510, which includes the functionality to produce a light signal that is processed by one or more optical circuit elements of the optical circuitry of circuit 1502. Circuit 1502 can include passive MZI 1530 to modulate the light signal transmitted from laser 1510. While represented as passive MZI, it will be understood that passive MZI 1530 can generally represent a passive modulator. In one example, laser 1510 is a continuous-wave laser. In one example, circuit 1502 includes a modulator to FM modulate the optical signal. In one example, the optical signal is generated with FM modulation by laser 1510. In one example, passive MZI 1530 includes one or more passive modulator components to encode the FM modulated signal with an AM signal, to generate an FM and AM modulated signal or AM and FM modulated signal.

An example of system 1500 includes reference (REF) loop 1582. Thus, the laser signal from laser 1510 can be split with splitter 1580 into a reference delay loop and a phased-lock loop (PLL) to be linearly chirped. Reference loop 1582 can provide a reference source signal prior to modulation of the signal for purposes of combining for processing.

In some scenarios, only the TX signal is power modulated. In this case the TTOF can be calculated from the electrical signal based on the AM modulation of the RX signal. As illustrated in system 1500, only the TX power is modulated and the LO signal is received from splitter 1520 after laser 1510, without being modulated by passive MZI 1530. Passive MZI 1530 thus only modulates the transmit path, with the LO path splitting off before the modulation. In such a case, the TOF delay can be measured by clocking the input electrical signal into the modulator and received signal.

The frequency modulated laser can be fed from splitter 1520 into passive MZI 1530, which can represent passive modulation for circuit 1502. The AM and FM modulated light can be split to two paths by splitter 1520, one for the LO signal and one for the TX path. PBS 1560 represents a PBS or circulator followed by other optical elements (integrated or free space optics) to emit the modulated LIDAR signal through free space optics 1504. Optics 1504 and PBS 1560 can couple back the RX signal from the target and combine with the LO using an optical combiner, represented by combiner 1540.

In one example, passive MZI 1530 does not perform amplification of the signal. SOA (semiconductor optical amplifier) 1570 can provide optical amplification for the signal in the transmit path. Passive MZI 1530 can provide the AM and FM modulated signal to SOA 1570 for amplification, and SOA 1570 can provide the amplified signal to PBS 1560 to be emitted through optics 1504.

Combiner 1540 can receive a reference signal from splitter 1520 and the reflection signal from PBS 1560. Splitter 1520 can provide the FM and AM modulated signal as an LO signal for processing by detector 1552 and detector 1554. Combiner 1540 provides the signals to one or more photodetectors, identified as detector 1552 and detector 1554. Detector 1552 and detector 1554 can provide the signal information to one or more processing components. Circuit 1502 can provide optical signal information to a processor or component for final signal processing.

An example of system 1500 includes detector 1532, which receives the modulated signal from passive MZI 1530. Detector 1532 can generate an electrical signal that can be used as a reference by the processing components. Detector 1552 and detector 1554 also generate output electrical signals to be processed by the processing components.

The processing components, based on the signals from the detectors from circuit 1502, can extract amplitude modulation or TOF information from FM modulation and determine the range and velocity of targets identified in the scanning. The processing components can map targets with a point set with per point information based on the combined AM and FM signal.

The processing components (not specifically shown) receive detected signal information from detector 1552, detector 1554, and detector 1532 and apply signal processing on the reflection signal to generate a target point set. The processing can include frequency processing to generate target points based on range and Doppler information. The processing can also include TOF processing to provide TOF range information from the AM modulation on the RX signal.

Figure 16:
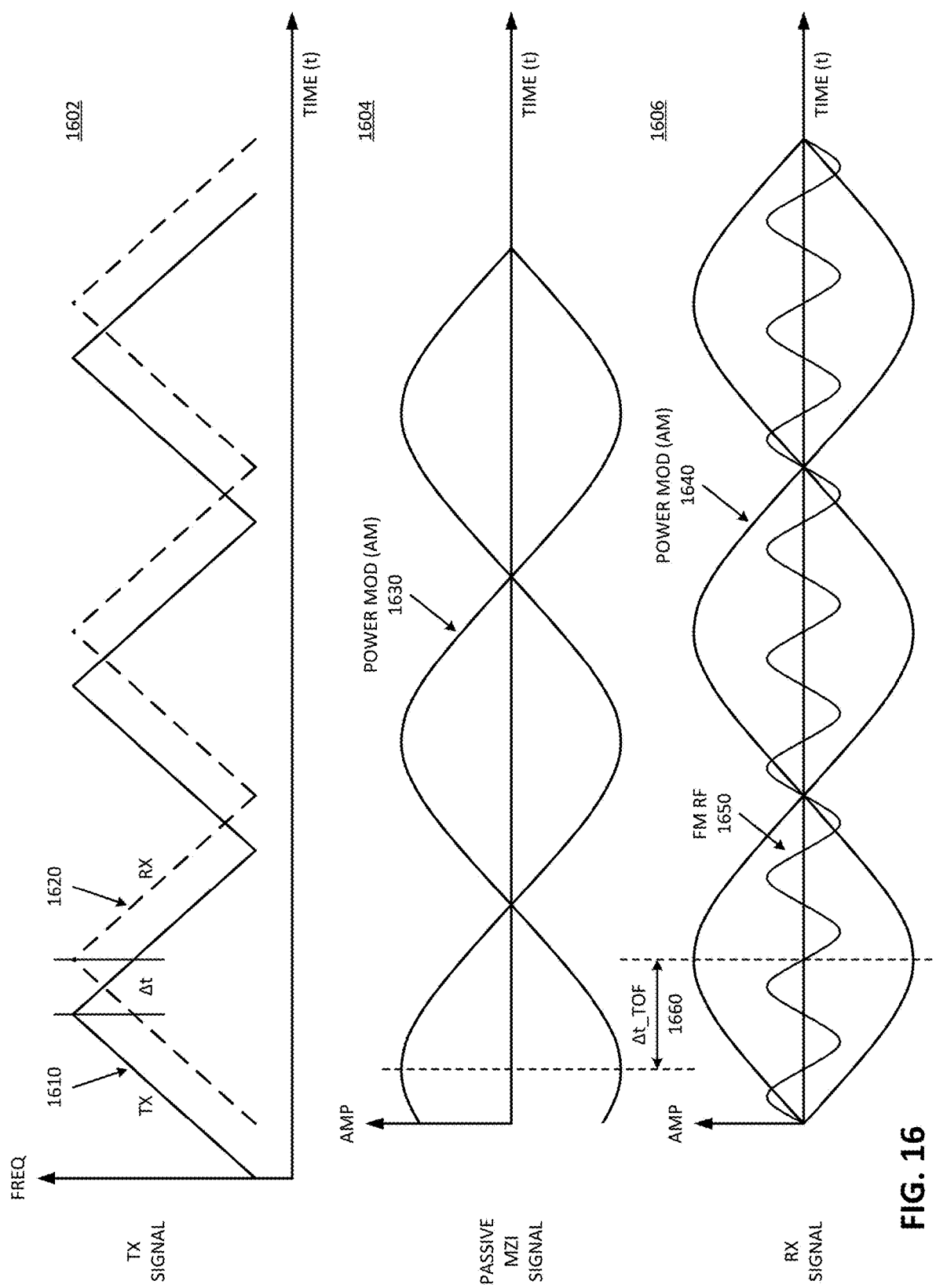
FIG. 16 illustrates an example an AM signal based on passive modulation to provide a combined FM and AM signal.

FIG. 16 illustrates an example an AM signal based on passive modulation to provide a combined FM and AM signal. Diagram 1602 represents time of flight signaling by way of providing passive AM modulation. Signal 1610 is represented by a solid line triangle signal, which represents the transmit signal TX. The TX signal has FM modulation and AM modulation. Signal 1620 is represented by a dashed line triangle signal, which represents the reflection signal RX.

As the beam comes back from the target, the RX signal will be offset in time (Δt) with a value corresponding to the range of the object. Measuring the total time of flight TToF (Δt) provides a range measurement that is not a function of Doppler, while the beat frequency from the frequency modulated signal is a function of Range and Doppler. Combining the information of the TToF and beat frequency allows for range and doppler calculation within a single measurement.

Diagram 1604 provides a representation of the passive modulation signal of diagram 1602. Diagram 1604 is represented as a passive MZI signal. Signal 1630 is a power modulation (MOD) or AM modulated signal to encode onto the carrier FMCW signal.

Diagram 1606 provides a representation of the passive modulation signal and the FM modulation signal overlayed on the same graph. Diagram 1606 represents an RX signal having the FM RF (radio frequency) carrier frequency and the AM modulation. Signal 1640 represents the reflected power modulation (MOD) AM signal. Signal 1650 represents the FM RF signal of the RX signal.

Diagram 1604 and diagram 1606 provide a representation of the Δt of the RX signal. Signal 1630 of diagram 1604 has a peak amplitude (AMP), as does the AM signal 1640 of diagram 1606. The time difference between the peak of signal 1630 and the peak of signal 1640 is Δt TOF (time of flight) 1660. Thus, the peaks of the AM signals can be used to detect the range information from the RX signal.

Figure 17:
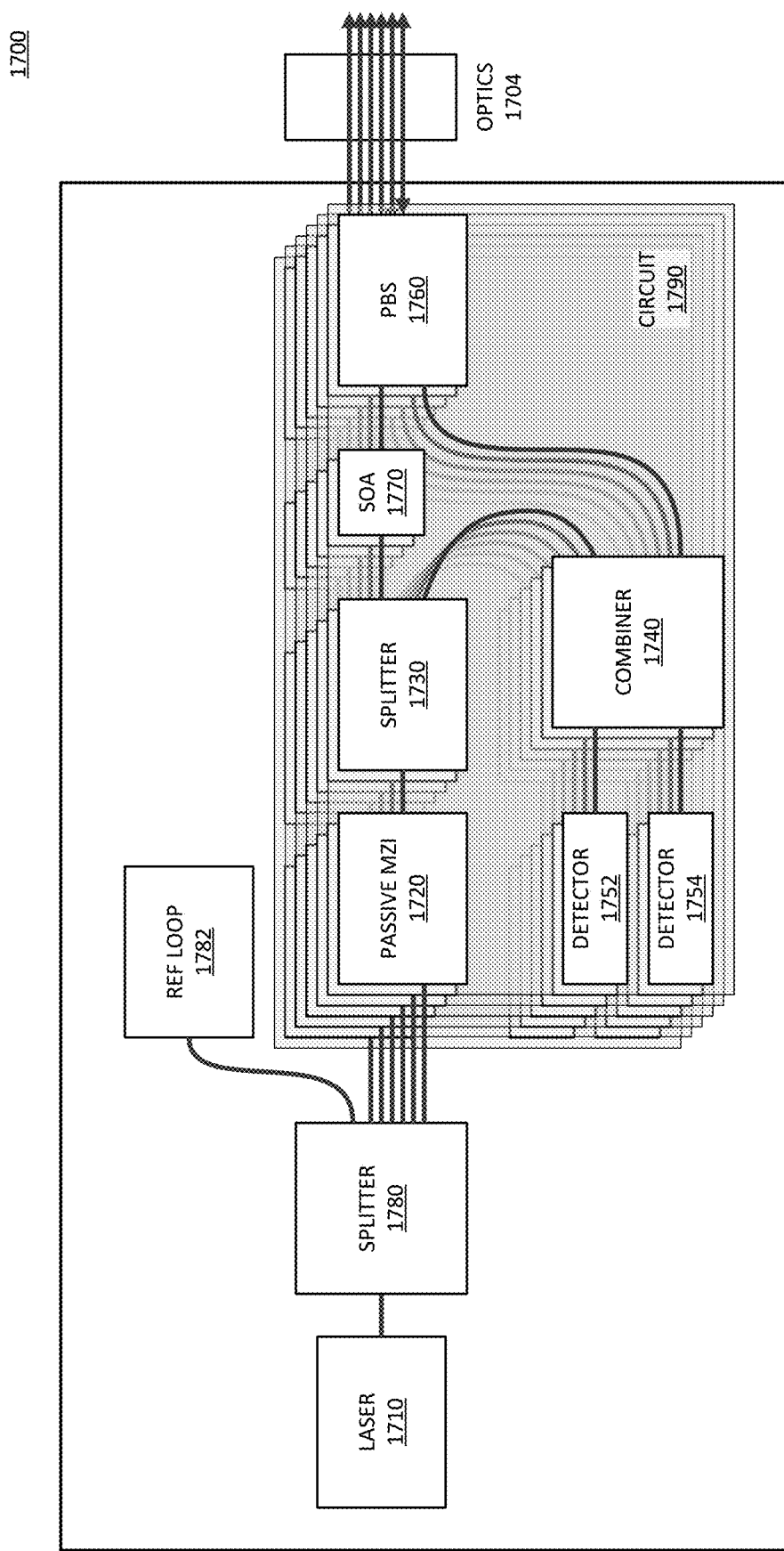
FIG. 17 illustrates an example of a LIDAR system with passive AM modulation for a multipath system.

FIG. 17 illustrates an example of a LIDAR system with passive AM modulation for a multipath system. System 1700 illustrates a LIDAR system in accordance with embodiments of the present disclosure. System 1700 represents multiple instances of components in accordance with an example of system 1400. It will be understood that the use of multiple beams can be implemented for any instance of optical circuit described, and for simplicity, only the configuration of multiple optical circuits in accordance with system 1400 is illustrated. The modulation for multiple beams can be performed with passive or with active modulation components.

System 1700 can include separate processing components (not specifically shown). System 1700 includes laser 1710, which includes the functionality to produce a light signal that is processed by multiple optical circuits 1790 of the optical circuitry of circuit 1702.

Each optical circuit 1790 of circuit 1702 can include passive MZI 1720 to modulate the light signal transmitted from laser 1710. In one example, laser 1710 is a continuous-wave laser. While represented as passive MZI, it will be understood that passive MZI 1720 can generally represent a passive modulator. In one example, laser 1710 is a continuous-wave laser. In one example, circuit 1702 includes a modulator to FM modulate the optical signal. In one example, the optical signal is generated with FM modulation by laser 1710. In one example, passive MZI 1720 includes one or more passive modulator components to encode the FM modulated signal with an AM signal, to generate an FM and AM modulated signal or AM and FM modulated signal.

An example of system 1700 includes reference (REF) loop 1782. Thus, the laser signal from laser 1710 can be split with splitter 1780 into a reference delay loop and a phased-lock loop (PLL) to be linearly chirped. Reference loop 1782 can provide a reference source signal prior to modulation of the signal for purposes of combining for processing.

The frequency modulated laser can be fed into passive MZI 1720, which can represent passive modulation for circuit 1702. The AM and FM modulated light can be split to two paths by splitter 1730, one for the local oscillator (LO) and one for the transmitter (TX). PBS 1760 represents a PBS or circulator followed by other optical elements (integrated or free space optics) to emit the modulated LIDAR signal through free space optics 1704. Optics 1704 and PBS 1760 can couple back the return signal (RX) from the target and combine with the LO using an optical combiner, represented by combiner 1740.

In one example, passive MZI 1720 does not perform amplification of the signal. SOA (semiconductor optical amplifier) 1770 can provide optical amplification for the signal in the transmit path. Splitter 1730 can provide the AM and FM modulated signal to SOA 1770 for amplification, and SOA 1770 can provide the amplified signal to PBS 1760 to be emitted through optics 1704.

Combiner 1740 can receive a reference signal from splitter 1730 and the reflection signal from PBS 1760. Splitter 1730 can provide the FM and AM modulated signal as a local oscillator (LO) signal for processing by detector 1752 and detector 1754. Combiner 1740 provides the signals to one or more photodetectors, identified as detector 1752 and detector 1754. Detector 1752 and detector 1754 can provide the signal information to one or more processing components. Circuit 1702 can provide optical signal information to a processor or component for final signal processing.

The processing components, based on the signals from the detectors from circuit 1702, can extract AM information from FM modulation and determine the range and velocity of targets identified in the scanning. The processing components can map targets with a point set with per point information based on the combined AM and FM signal.

The processing components (not specifically shown) receive detected signal information from detector 1752 and detector 1754 and apply signal processing on the reflection signal to generate a target point set. The processing can include frequency processing to generate target points based on range and Doppler information. The processing can also include TOF processing to provide TOF range information based on the AM modulation of the reflection signal.

A multiple beam circuit can include a single laser and reference loop, with common optics for the multiple beams. The use of multiple transmit and receive/detection circuits can allow different beam steering and sweeping of different areas. In one example, the various transmit and receive paths provided by circuits 1790 can be integrated onto the same integrated circuit or chip. In one example, the various transmit and receive paths of circuits 1790 can be implemented as discrete components combined in parallel with common source and reference signals. In one example, different instances of optical circuits 1790 can implement different types of modulation. Thus, multiple beams can combine any example of active or passive modulation structures.

In addition to multiple beams, or alternatively to multiple beams, different LIDAR systems can be used in parallel. For example, lasers having different wavelengths can be used in parallel to perform sensing of a target.

Figure 18:
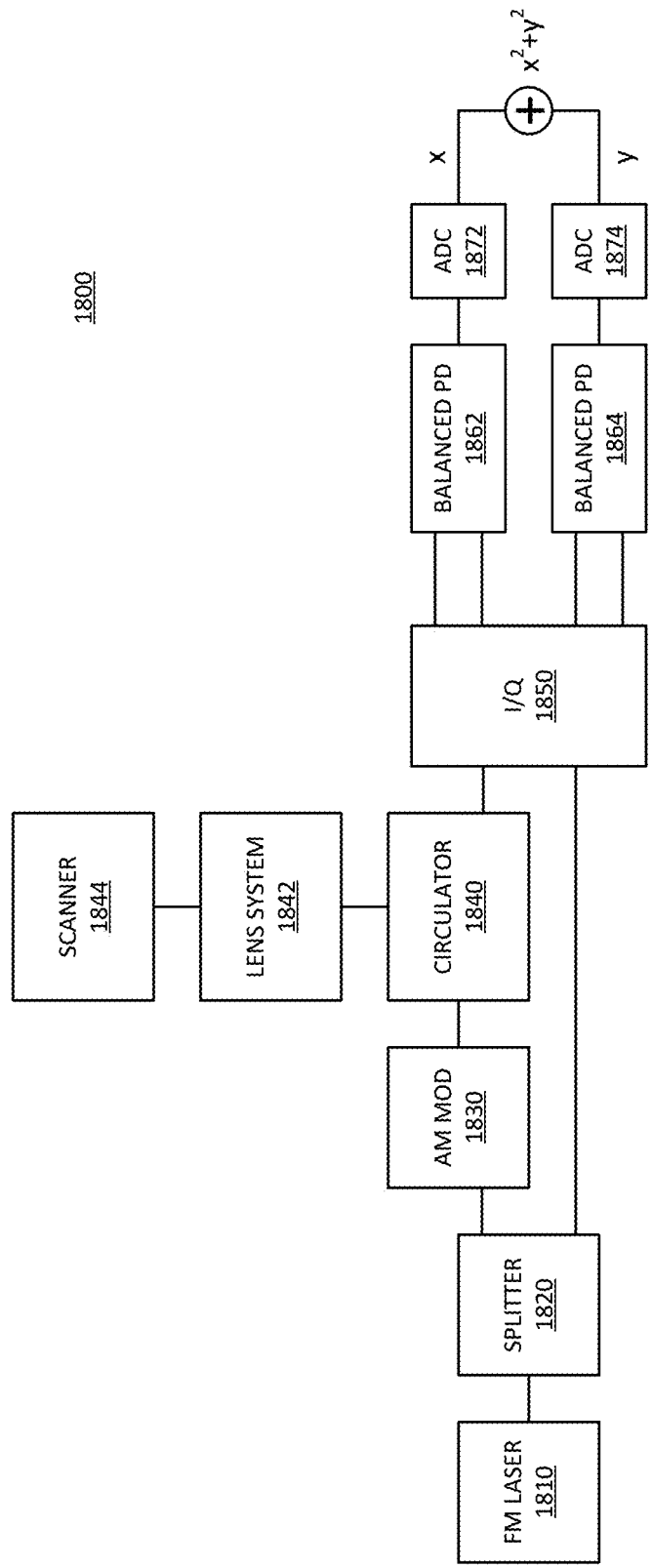
FIG. 18 illustrates an example of a LIDAR system with an IQ implementation to distinguish AM information from FM information for a LIDAR signal.

FIG. 18 illustrates an example of a LIDAR system with an I/Q implementation to distinguish AM information from FM information for a LIDAR signal. System 1800 represents an optical system in accordance with embodiments of the present disclosure. The optical components can be in accordance with any example herein to transmit an optical signal with power and frequency modulation.

Generally, in an FMCW DSP (digital signal processing) chain, samples from the ADC go through time domain filters for signal conditioning. Following time domain conditioning, a time-to-frequency domain conversion block (for example, an FFT (fast Fourier transform)) converts the time domain samples to frequency domain samples. In the frequency domain, more filters can be applied to further condition/improve the signal quality. After the frequency domain filtering, a frequency domain peak picking algorithm is employed to estimate where the targets are. These peaks are a function of both the range and the relative Doppler of the target.

System 1800 represents a system with that generates a scanning beam that includes both FM and AM modulation. FM laser 1810 represents the FMCW signal with FM modulation. The signal can be split with splitter 1820 to provide AM modulation 1830 on the FM modulated signal, to generate an FM and AM modulated signal, which could also be referred to as a frequency and power modulated signal. AM modulation 1830 can be active modulation in accordance with embodiments of active modulation of the present disclosure. AM modulation 1830 can be passive modulation in accordance with embodiments of passive modulation of the present disclosure. Circulator 1840 can provide the modulated signal to lens system 1842 and scanner 1844 to transmit and receive signal reflections of targets in a scanned environment. System 1800 can include a PBS in place of circulator 1840.

System 1800 can provide an additional estimate of the range of the target with time domain processing as well as the frequency domain processing. Circulator 1840 can provide a received signal or signal reflection of the transmitted power and frequency modulated signal to I/Q (in-phase/quadrature) processor 1850, component, or other signal processor. The processor can use the frequency modulated signal from splitter 1820 as a reference to compare with the received signal from circulator 1840. In one example, I/Q processor 1850 has a balanced PD (photodetector) stage followed by an ADC stage.

In one example, I/Q processor 1850 includes two paths, one for AM modulation and another for FM modulation. Balanced PD 1862 can feed to ADC 1872 to generate an 'x' component. Balanced PD 1864 can feed to ADC 1874 to generate a 'y' component. The combined processed signal allows improvement of the traditional FMCW signal information with additional range information from AM signaling, which can improve the target point estimates. System 1800 can provide simultaneous detection of range and velocity from the signal. System 1800 represents the AM signal component with the combiner after the ADC stage, with the signal represented as the combination of $x^2+y^2$.

Figure 19:
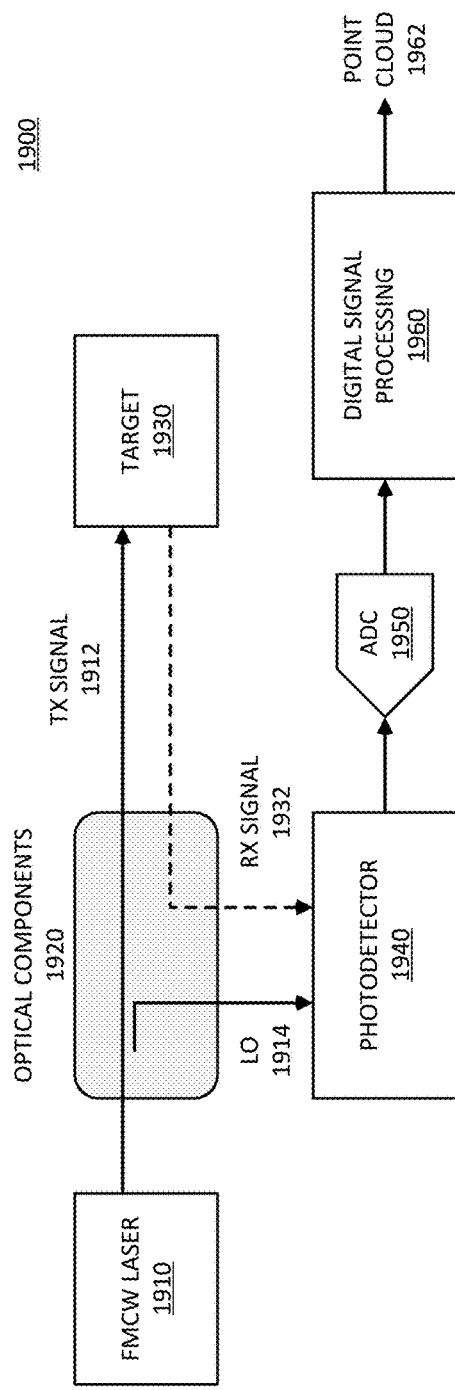
FIG. 19 illustrates an example of a LIDAR system that provides FM and AM modulation on a LIDAR signal.

FIG. 19 illustrates an example of a LIDAR system that provides FM and AM modulation on a LIDAR signal. System 1900 provides an example of system 1800. FMCW laser 1910 can be a laser transmission system in accordance with any example herein that provides a light signal for both FM and AM modulation. The modulation can be or include active AM modulation or passive AM modulation. Optical components 1920 provide the modulation and optics to transmit TX signal 1912 to target 1930 and receive the reflection signal represented by RX signal 1932.

Photodetector 1940 can receive RX signal 1932 from optical components 1920 from target 1930, and LO signal 1914 from optical components 1920 from FMCW laser 1910. System 1900 can condition the signal with ADC 1950 and provide the conditioned signal for digital signal processing 1960. In one example, digital signal processing 1960 generates point cloud 1962, which can represent a group of points of estimates of target information. A point cloud can refer to a group of target estimate values that have corresponding coordinate information to spatially map the points relative to each other.

System 1900 can generate an estimate of the range to the target(s) using a time domain processing data path including a correlator and a delay estimator to measure ΔT. The time domain estimate of range can be combined with frequency domain peak information, to generate a more robust estimate of range and velocity per point in the point cloud.

Figure 20:
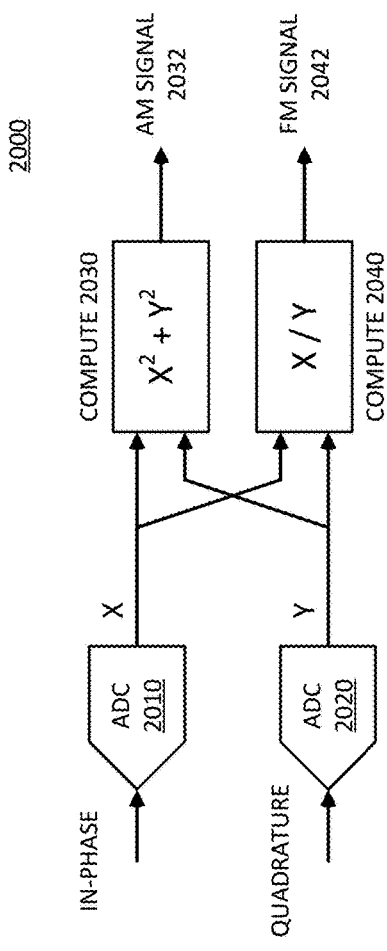
FIG. 20 illustrates an example of I/Q detection for a LIDAR system that provides FM and AM modulation on a LIDAR signal.

FIG. 20 illustrates an example of I/Q detection for a LIDAR system that provides FM and AM modulation on a LIDAR signal. System 2000 illustrates I/Q detection for a receiver in accordance with an example of system 1800 or DSP in accordance with an example of system 1900.

I/Q detection enables completely separating out AM and FM components of a received signal. The X path is the In Phase signal (such as I/Q 1850 to balanced PD 1862 to ADC 1872 of system 1800) and the Quadrature signal is the Y path (such as I/Q 1850 to balanced PD 1864 to ADC 1874 of system 1800). The in-phase signal is received at ADC 2010 which generates the X component, which can be provided to compute block 2030 and compute block 2040. The quadrature signal is received at ADC 2020 which generates the Y component, which can be provided to compute block 2030 and compute block 2040.

The processing can include calculations of $X^2+Y^2$ for the AM signal and X/Y for the FM signal. Compute block 2030 can compute $X^2+Y^2$ for AM signal 2032 and compute block 2040 can compute X/Y for FM signal 2042. The computation of X/Y can lead to noise enhancement. In one example, system 2000 provides regularized division to mitigate noise enhancement. The regularized division can include a computation of X/(Y+Delta), where Delta is an estimate adaptively based on signal and noise powers.

Figure 21:
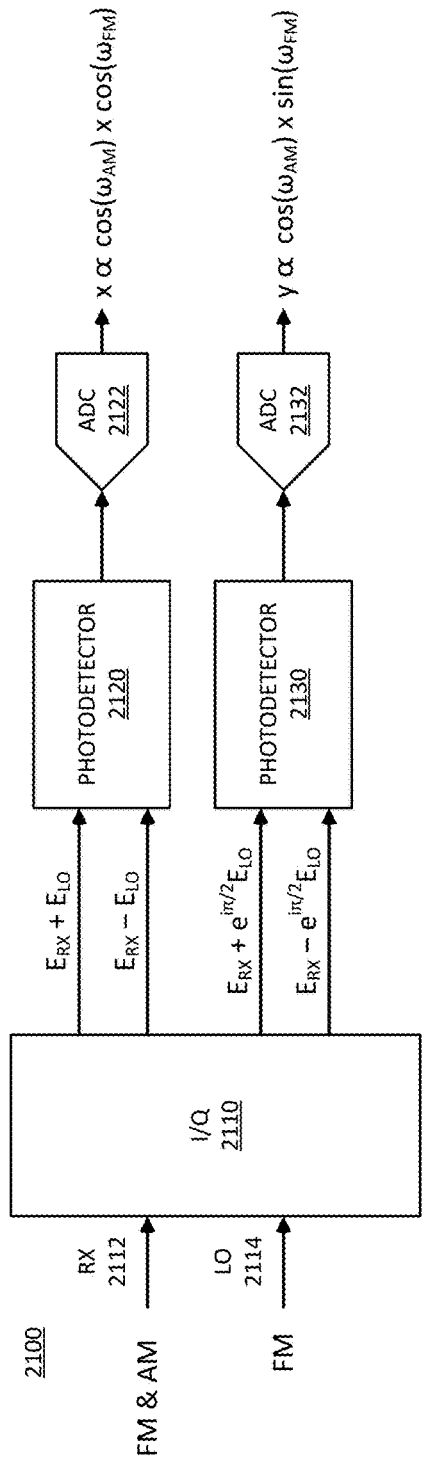
FIG. 21 illustrates an example of signal processing for an FM and AM modulated signal.

FIG. 21 illustrates an example of signal processing for an FM and AM modulated signal. System 2100 illustrates I/Q detection for a receiver in accordance with embodiments of the present disclosure.

In some scenarios, the amplitude modulation (AM) part of the frequency modulation (FM) can be extracted using an in-phase/quadrature (I/Q) detector following digital post processing. In one example, with post processing in the signal processing domain, the system can extract the AM portion and FM portion of the signal to separately estimate range and velocity from a signal that simultaneously includes AM and FM information.

RX signal 2112 is the received signal or the reflected beam, which includes both an FM portion and an AM portion. LO signal 2114 is the local oscillator signal, which includes the FM portion of the signal. In one example, the system uses the FM information of the LO signal in I/Q detector 2110.

I/Q detector 2110 can generate signals $E_{RX}+E_{LO}$ and $E_{RX}-E_{LO}$ for a first balanced PD, represented by photodetector 2120, and signals $E_{RX}+e^{i\pi/2}*E_{LO}$ and $E_{RX}-e^{i\pi/2}*E_{LO}$ for a second balanced PD, represented by photodetector 2130. Photodetector 2120 provides a signal output to ADC 2122, to generate an X signal that is proportional to $\cos(\omega_{AM})\times\cos(\omega_{FM})$. Photodetector 2130 provides a signal output to ADC 2132, to generate a Y signal that is proportional to $\cos(\omega_{AM})\times\sin(\omega_{FM})$. The LIDAR system can perform a computation X/Y for FM and a computation $X^2+Y^2$ for AM, where the computations can be based on the X and Y signals generated by system 2100.

Figure 22:
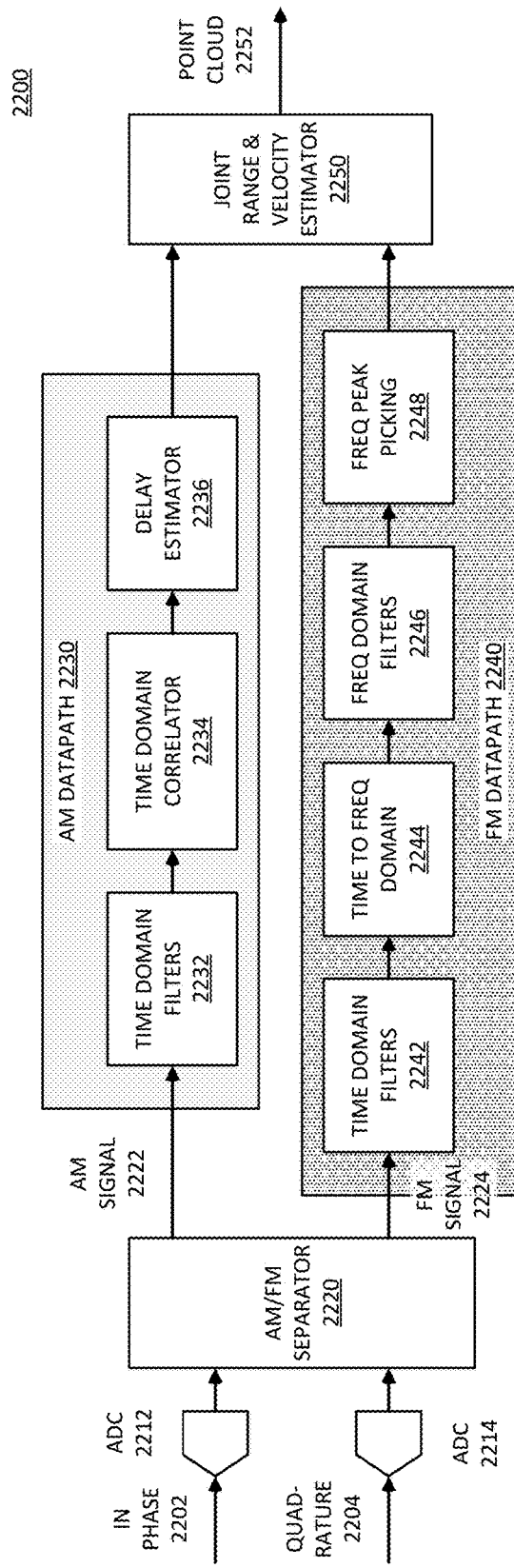
FIG. 22 illustrates an example of an AM path and an FM path for I/Q detection.

FIG. 22 illustrates an example of an AM path and an FM path for I/Q detection. System 2200 illustrates I/Q detection for a receiver in accordance with embodiments of the present disclosure. System 2200 provides a high-level schematic of a DSP architecture for simultaneous range and velocity measurement based on a combined signal with AM modulation and FM modulation. In addition to the estimate of range of a target based on FMCW, system 2200 can provide an estimate based on time domain processing.

The signal after time domain filters is tapped off and fed into an alternate datapath, which aims to estimate dT (delta time) using time domain processing. This datapath includes a correlator that either runs a correlation with a known time domain waveform or runs an autocorrelation of the time domain samples to estimate the delay between the two T_off periods (beginning of a sweep (T_off)). A delay estimator takes in the output of the correlator block and looks for peaks in the time domain. These peaks correspond to the time-delay providing an estimate of the range of the target.

The signal can include in-phase portion 2202 and quadrature phase portion 2204. In-phase portion 2202 has a path through ADC 2212 to AM/FM separator 2220. In-phase portion 2202 can be portions of a signal that are output from photodetector 2120 and/or ADC 2122 (depicted in FIG. 21). Quadrature phase portion 2204 can be portions of a signal that are output from photodetector 2130 and/or ADC 2132 (depicted in FIG. 21). Quadrature phase portion 2204 has a path through ADC 2214 to AM/FM separator 2220. AM/FM separator 2220 can generate AM signal 2222 and FM signal 2224. AM signal 2222 can be used to provide an estimate of the range with a time domain processing datapath, represented as AM datapath 2230. AM datapath 2230 can include time domain filters 2232 for improving SNR (signal to noise ratio) of the AM signal, time domain correlator 2234 to correlate the AM signal with an AM modulation waveform reference, and delay estimator 2236 to estimate the TOF.

FM signal 2224 can be used to provide an estimate of range and Doppler shift with a frequency domain processing datapath, represented as FM datapath 2240. FM datapath 2240 can include time domain filters 2242 to improve SNR, time to frequency domain conversion 2244, frequency domain filters 2246 to improve SNR, and frequency domain peak picking 2248 to estimate range and Doppler.

System 2200 combines the information from AM datapath 2230 and FM datapath 2240. Joint range and velocity estimator 2250 represents a combination of the information from the two data processing paths, to provide point cloud 2252 which represents a point set with estimates of range and velocity per point in a single measurement.

Figure 23:
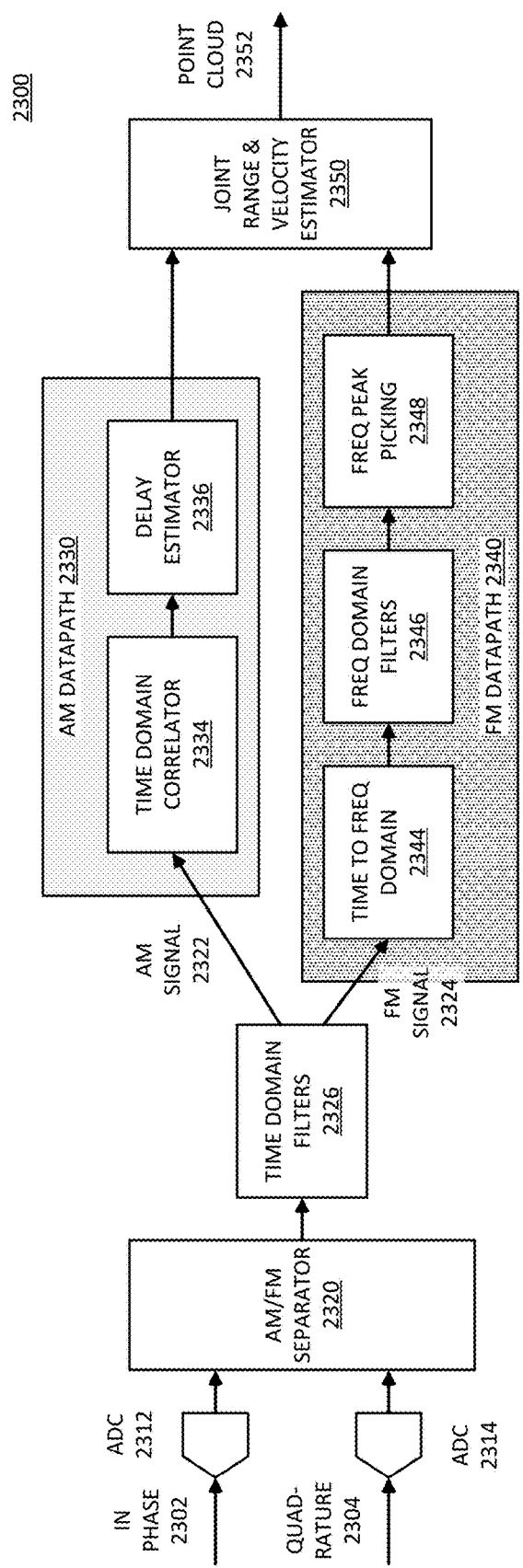
FIG. 23 illustrates an example of an AM path and an FM path for I/Q detection with combined time domain filters.

FIG. 23 illustrates an example of an AM path and an FM path for I/Q detection with combined time domain filters. System 2300 illustrates I/Q detection for a receiver in accordance with embodiments of the present disclosure. System 2300 provides a high-level schematic of a DSP architecture for simultaneous range and velocity measurement based on a combined signal with AM modulation and FM modulation. In addition to the estimate of range of a target based on FMCW, system 2300 can provide an estimate based on time domain processing.

The signal after time domain filters is tapped off and fed into an alternate datapath, which aims to estimate dT (delta time) using time domain processing. This datapath includes a correlator that either runs a correlation with a known time domain waveform or runs an autocorrelation of the time domain samples to estimate the delay between the two T_off periods (beginning of a sweep (T_off)). A delay estimator takes in the output of the correlator block and looks for peaks in the time domain. These peaks correspond to the time-delay providing an estimate of the range of the target.

The signal can include in-phase portion 2302 and quadrature phase portion 2304. In-phase portion 2202 can be portions of a signal that are output from photodetector 2120 and/or ADC 2122 (depicted in FIG. 21). Quadrature phase portion 2204 can be portions of a signal that are output from photodetector 2130 and/or ADC 2132 (depicted in FIG. 21). In-phase portion 2302 has a path through ADC 2312 to AM/FM separator 2320. Quadrature phase portion 2304 has a path through ADC 2314 to AM/FM separator 2320. AM/FM separator 2320 can generate AM signal 2322 and FM signal 2324. AM signal 2322 can be used to provide an estimate of the range with a time domain processing datapath, represented as AM datapath 2330. FM signal 2324 can be used to provide an estimate of range and Doppler shift with a frequency domain processing datapath, represented as FM datapath 2340.

In one example, system 2300 includes time domain filters 2326 to apply time domain filtering to improve SNR of AM signal 2322 and FM signal 2324. Time domain filters 2326 can provide AM signal 2322 to AM datapath 2330. AM datapath 2330 can include time domain correlator 2334 to correlate the AM signal with an AM modulation waveform reference and delay estimator 2336 to estimate the TOF.

Time domain filters 2326 can provide FM signal 2324 to FM datapath 2340. FM datapath 2340 can include time to frequency domain conversion 2344, frequency domain filters 2346 to improve SNR, and frequency domain peak picking 2348 to estimate range and Doppler.

System 2300 combines the information from AM datapath 2330 and FM datapath 2340. Joint range and velocity estimator 2350 represents a combination of the information from the two data processing paths, to provide point cloud 2352 which represents a point set with estimates of range and velocity per point in a single measurement.

Figure 24:
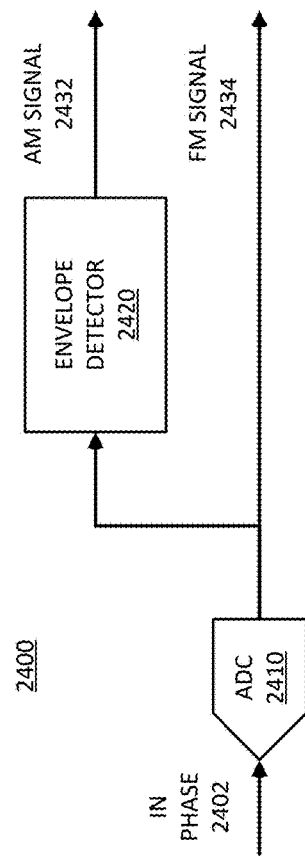
FIG. 24 illustrates an example of in-phase detection for an FM and AM modulated LIDAR signal.

FIG. 24 illustrates an example of in-phase detection for an FM and AM modulated LIDAR signal. System 2400 illustrates I/Q detection for a receiver in accordance with the embodiments of the present disclosure. System 2400 represents processing for only an in-phase detector. An in-phase detector can be used if I/Q detection is not a viable option due to hardware requirements or constraints on components such as ADCs.

System 2400 can separate the AM component from the received signal that has AM and FM modulation, by the application of an envelope detector. In-phase portion 2402 can be portions of a signal that are output from photodetector 2120 and/or ADC 2122 (depicted in FIG. 21). In-phase signal 2402 can be received at ADC 2410, which can generate FM signal 2434. FM signal 2434 includes the FM signal information and will also include the AM signal information, which could cause degradation of frequency domain peak detection performance. In an implementation of system 2400, keeping the AM signal bandwidth relatively small will mitigate performance loss.

FM signal 2434 can be sent to envelope detector 2420 to extract AM signal information. Envelope detector 2420 can include a low pass filter followed by a magnitude detector to generate AM signal information, represented by AM signal 2432. AM signal 2432 and FM signal 2434 represent the separated AM and FM signal portions of a combined signal for simultaneous range and velocity estimation.

Figure 25:
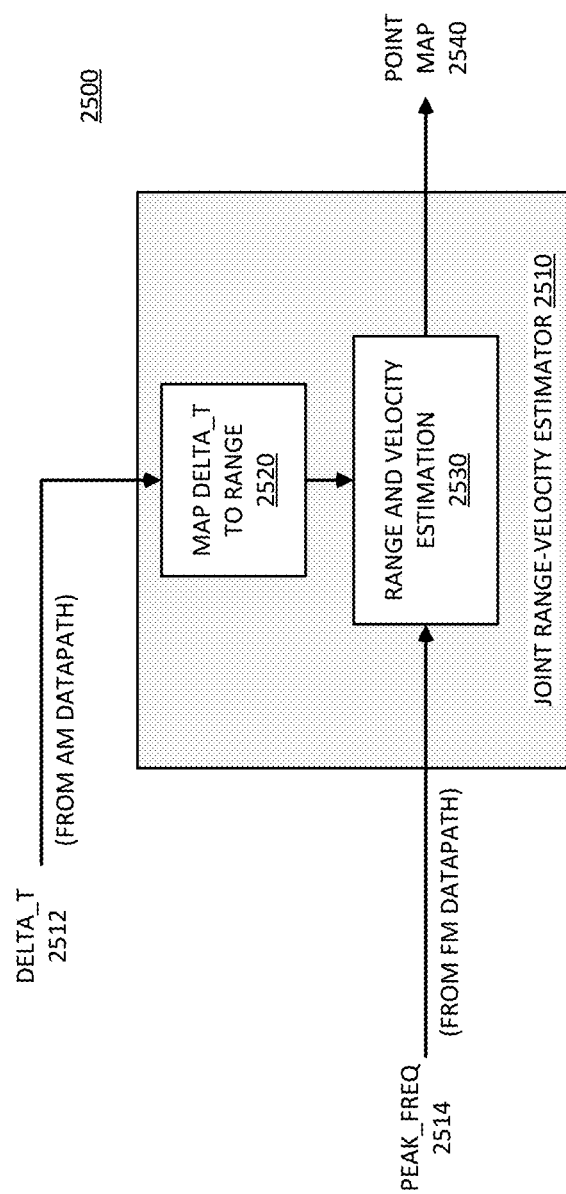
FIG. 25 illustrates an example of joint estimation from AM and FM datapaths for concurrent range and velocity estimation.

FIG. 25 illustrates an example of joint estimation from AM and FM datapaths for concurrent range and velocity estimation. System 2500 illustrates joint estimation for detection in accordance with embodiments of the present disclosure.

System 2500 receives a Peak_Freq input from an FM datapath, represented as Peak_Freq 2514, and a Delta_T input from an AM datapath, represented as Delta_T 2512. Delta_T 2512 can be portions of a signal that are output from envelope detector 2420 (e.g., AM signal 2432 depicted in FIG. 24). Peak_Freq 2514 can be portions of a signal that are output from an ADC (e.g., FM signal 2434 depicted in FIG. 24). System 2500 provides the inputs to joint range-velocity estimator 2510 to generate point map 2540. Joint range-velocity estimator 2510 receives Delta_T 2512 at block 2520 to generate a map of Delta_T to range. Joint range-velocity estimator 2510 receives Peak_Freq 2514 at block 2530 to generate an estimate of range and velocity, which can be joined with the map of Delta_T to range from block 2520 to generate the joint estimation information, point map 2540.

Typically, Delta_T is mapped to range using an affine function, such as Range=C0*Delta_T+C1. Typically, peak frequency is a function of range and velocity using a function such as Peak_Freq=B0*Range+B1*Velo+B2. Given Delta_T and peak frequency, range and velocity can be estimated, given C0, C1, B0, B1, and B2 are calibrated per system. Estimates can be improved by accounting for presence of noise in Delta_T and Peak_Freq estimates using regularized least squares estimation.

Figure 26:
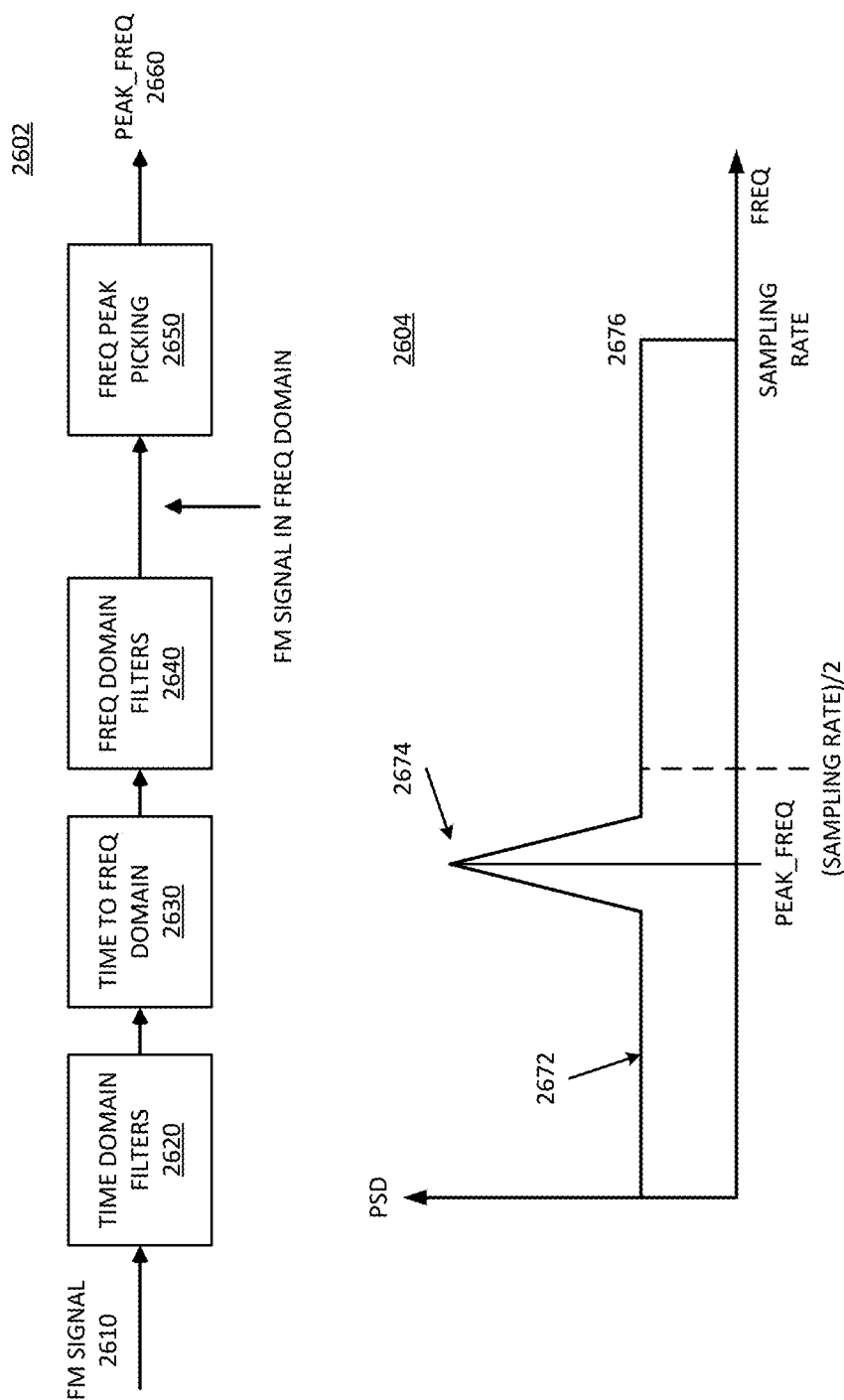
FIG. 26 illustrates an example an FM datapath processing for frequency peak selection.

FIG. 26 illustrates an example an FM datapath processing for frequency peak selection. Path 2602 represents a portion of an FM datapath. Path 2602 receives FM signal 2610 at time domain filters 2620. Time domain filters 2620 can provide the filtered signal to time to frequency domain conversion 2630, which provides the converted signal to frequency domain filters 2640. After the application of frequency domain filters 2640, the signal in FM datapath 2602 is an FM signal in the frequency domain. FM datapath 2602 includes frequency peak picking 2650 to pick the strongest peak in the frequency domain. The output of FM datapath 2602 is Peak_Freq 2660.

The strongest peak's frequency depends on both range and relative Doppler of the target. The peak detector of frequency peak picking 2650 can employ additional techniques to improve probability of detection and false detection metrics. In one example, the peak detector only picks peaks above a certain intensity or SNR. In one example, the peak detector only picks peaks within a range of frequencies. In one example, the peak detector interpolates between two neighboring bins to improve range and velocity precision.

Diagram 2604 provides a diagrammatic representation of frequency (FREQ) versus peak signal detection (PSD). Signal 2672 represents the graphing of frequency versus PSD, and includes Peak_Freq 2674. Signal 2672 has a frequency limit 2676 based on the sampling rate. The sampling rate can be twice the highest frequency of the anticipated signal (the Nyquist rate) to avoid aliasing of the signal. The peak frequency selected is the highest peak based on the computations made.

Figure 27:
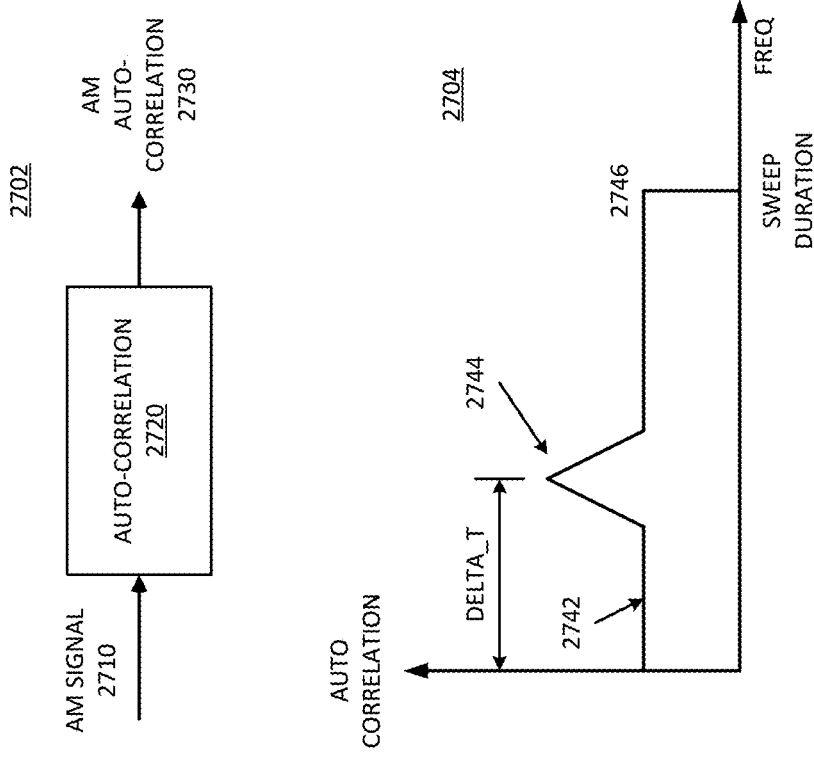
FIG. 27 illustrates an example an AM datapath processing for time domain correlation.

FIG. 27 illustrates an example an AM datapath processing for time domain correlation. Path 2702 represents a portion of an AM datapath. Path 2702 receives AM signal 2710 at autocorrelation 2720. AM signal 2710 can be portions of a signal that are output from an AM compute block (e.g., compute 2030 depicted in FIG. 20). Autocorrelation 2720 generates AM autocorrelation 2730 to represent an autocorrelated AM signal output.

The AM autocorrelation indicates peaks at the range of the target, based on the delay to the target. Diagram 2704 provides a diagrammatic representation of the graphing of frequency versus autocorrelation. Signal 2742 represents the graphing of frequency versus autocorrelation. Peak frequency 2744 occurs at Delta_T, which is the time delay indicative of range to target. Signal 2742 has a frequency limit 2746 based on the sweep duration.

Figure 28:
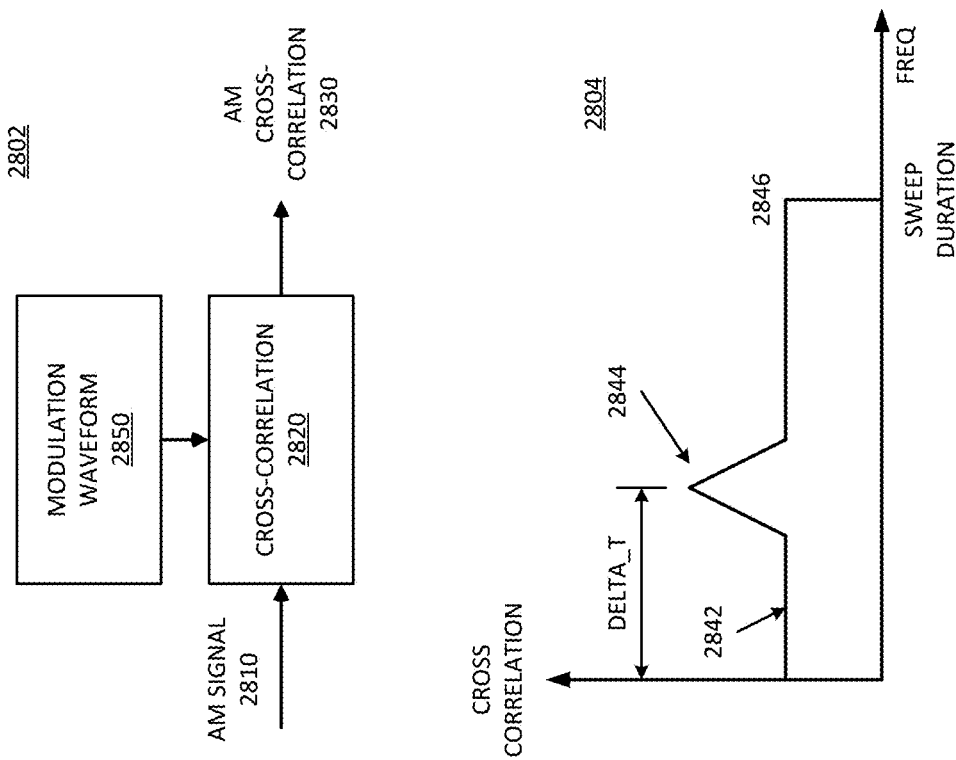
FIG. 28 illustrates an example of AM datapath processing for time domain correlation when only a transmit path is modulated.

FIG. 28 illustrates an example of AM datapath processing for time domain correlation when only a transmit path is modulated. Path 2802 represents a portion of an AM datapath. Path 2802 receives AM signal 2810 at cross-correlation 2820. AM signal 2810 can be portions of a signal that are output from an AM compute block (e.g., compute 2030 depicted in FIG. 20). Cross-correlation 2820 references modulation waveform 2850 as a reference signal and generates AM cross-correlation 2830 to represent a cross-correlated AM signal output.

The AM cross correlation indicates peaks at the range of the target, based on the delay to target. Diagram 2804 provides a diagrammatic representation of the graphing of frequency versus cross correlation. Signal 2842 represents the graphing of frequency versus cross correlation. Peak frequency 2844 occurs at Delta_T, which is the time delay indicative of range to target. Signal 2842 has a frequency limit 2846 based on the sweep duration.

Figure 29:
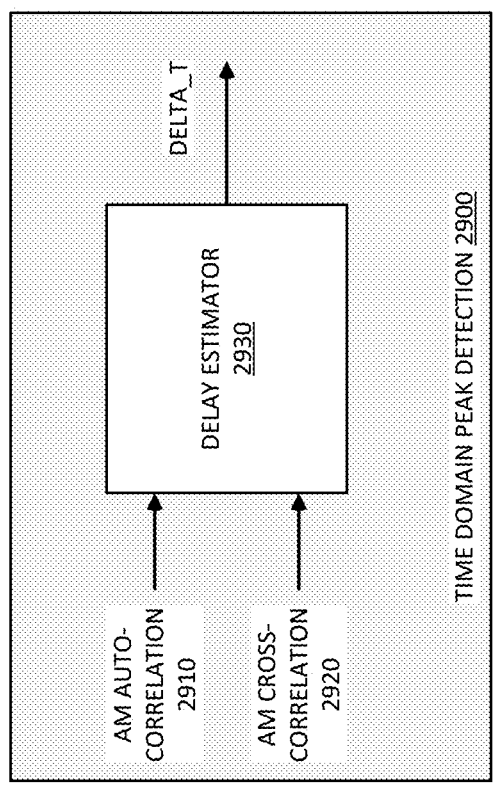
FIG. 29 illustrates an example of delay estimation for AM signal correlation.

FIG. 29 illustrates an example of delay estimation for AM signal correlation. A peak detector in the time domain provides an estimate of Delta T. Time domain peak detection 2900 receives AM auto-correlation 2910 (e.g., from path 2702 of FIG. 27) and AM cross-correlation 2920 (e.g., from path 2802 of FIG. 2800) at delay estimator 2930. Delay estimator 2930 can generate the Delta_T output signal as an estimate of time of flight.

Time domain peak detection 2900 can employ additional techniques to improve a probability of detection metric and reduce a false detection metric. In one example, time domain peak detection 2900 only picks peaks above a certain intensity/SNR. In one example, time domain peak detection 2900 only picks peaks within a range of Delta_T values. In one example, time domain peak detection 2900 interpolates between two neighboring samples to improve range precision.

Figure 30:
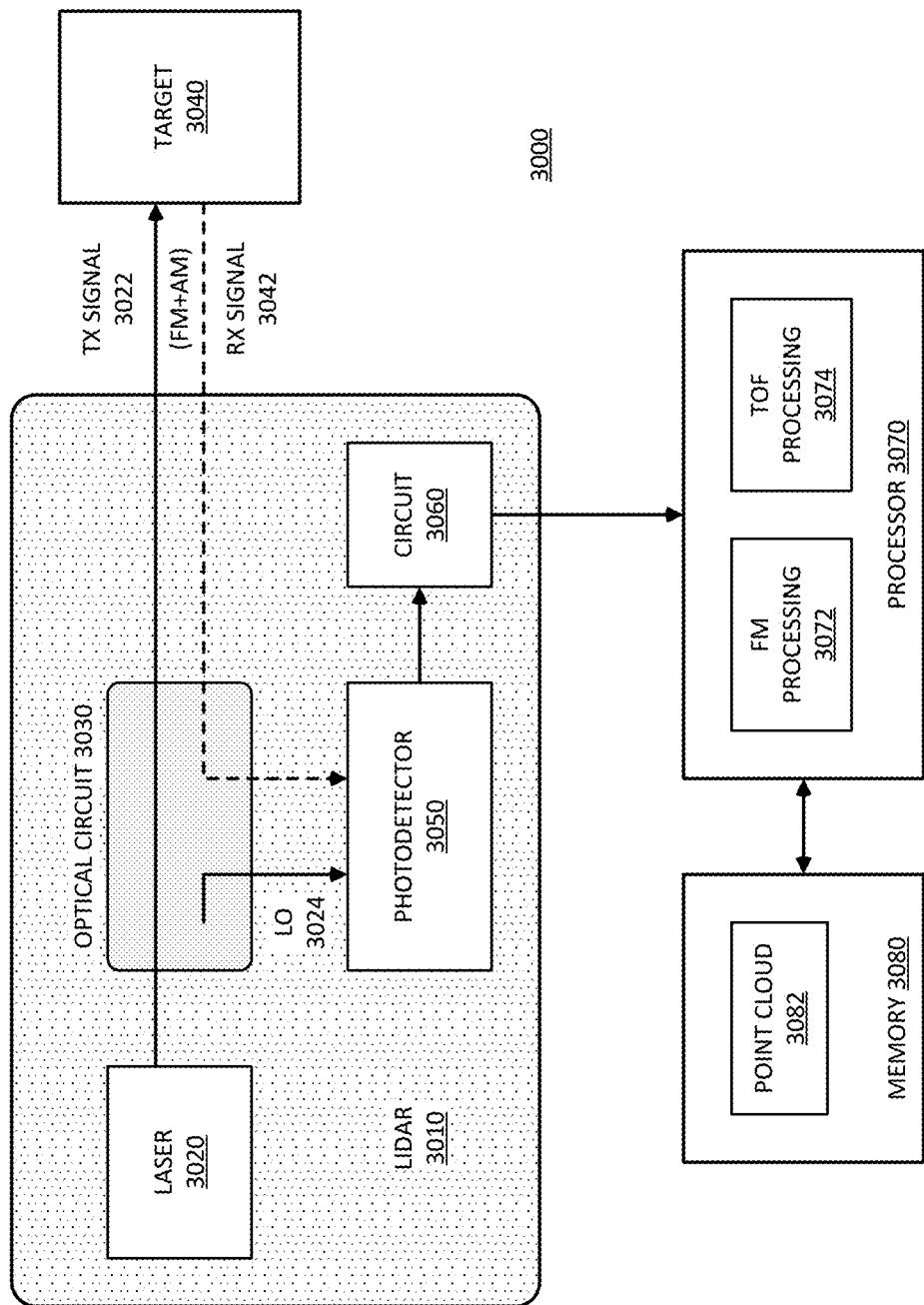
FIG. 30 illustrates an example of a LIDAR system that provides FM and AM modulation on a LIDAR signal.

FIG. 30 illustrates an example of a LIDAR system that provides FM and AM modulation on a LIDAR signal. System 3000 provides an example of system in accordance with embodiments of the present disclosure. System 3000 includes LIDAR 3010, which represents a LIDAR system in accordance with any example herein.

In one example, LIDAR 3010 is an optical chip, which is coupled to a processor device or processor chip and a memory device or memory chip. In one example, system 3000 is a single device with LIDAR, processing, and memory components in a single device or device package. In one example, LIDAR 3010 is one of multiple LIDAR components coupled to a processing device.

LIDAR 3010 includes laser 3020, which can be a laser transmission system in accordance with any example herein that provides an optical signal for both FM and AM modulation. Optical circuit 3030 includes one or more optical circuit components or elements to provide modulation, reference signaling, optical combining or other optical manipulation of an optical signal, amplification or attenuation, or other operation on an optical signal for LIDAR 3010. The modulation can be active or passive. Optical circuit 1730 provides the modulation and optics to transmit TX signal 3022 to target 3040 and receive the reflection signal represented by RX signal 3042. TX signal 3022 and RX signal 3042 include both FM and AM components. The AM component can be TOF information provided by cycling between baseline modulation power and a low power modulation, or can be provided by encoding an AM signal onto an FM optical signal. The reflection or RX signal will have the AM signal offset in time relative to the transmit or TX signal.

Photodetector 3050 can receive RX signal 3042 from optical circuit 3030 from target 3040, and LO signal 3024 from optical circuit 3030 from laser 3020. System 3000 can condition the signal with one or more circuit components, represented by circuit 3060. In one example, circuit 3060 includes an ADC component. Circuit 3060 can condition the received signal detected by photodetector 3050.

Processor 3070 represents a processor device or processing unit. Processor 3070 can be a standalone component or be integrated in a computer system. Processor 3070 includes FM processing 3072 and AM processing 3074 to represent the ability to extract FM information and AM information from the received signal detected by photodetector 3050. FM processing 3072 can be referred to as an FM datapath to generate FM range values. AM processing 3072 can be referred to as an AM datapath to generate AM range values. The FM information can enable processor 3070 to compute information related to range, based on Doppler information or Doppler shift caused by a relative velocity of the target. Thus, FM processing 3072 can generate a Doppler-adjusted range value.

The AM information can enable processor 3070 to compute information related to time of flight or signal delay information. Thus, AM processing 3074 can generate a range value corresponding to a signal propagation delay between the LIDAR system and target 3040. Processor 3070 can compute or determine a target range value for target 3040 based on the AM range value. Processor 3070 can compute or determine a target velocity value for target 3040 based on a difference between the Doppler-adjusted range value and the AM range value.

The values generated can be part of a point cloud of information to map an environment of target 3040. In one example, system 3000 includes memory 3080 coupled to processor 3070 to store information computed by processor 3070, and to provide data for computation by processor 3070. In one example, memory 3080 stores point cloud 3082, to represent the information gathered by scanning target 3040 with LIDAR 3010. Point cloud 3082 can be or include estimates or values computed by processor 3070 based on scanning target 3040.

In one example, optical circuit 3030 includes an active modulator that can determine a start to the period of time for the low-power mode based on receipt of a control signal at the active modulator. In one example, optical circuit 3030 includes an active modulator and LIDAR 3010 includes multiple photodetectors. In such an example, the active modulator can determine a start to the period of time for the low-power mode based on receipt of a control signal at a different photodetector, other than photodetector 3050. For example, LIDAR 3010 can include a controlling photodetector and one or more subsidiary detectors.

In general with respect to the descriptions herein, in one example, a light detection and ranging (LIDAR) system includes: a frequency modulation (FM) modulator to FM modulate a light signal as an FM modulated signal; an active modulator to provide time of flight (TOF) signal information with the FM modulated signal as a power and frequency modulated signal; an emitter to emit the power and frequency modulated signal; and a detector to receive a reflection of the power and frequency modulated signal and provide a detected signal for signal processing to generate a target point set, including frequency processing to generate target points based on range and Doppler information, and TOF processing to provide TOF range information.

In one example of the LIDAR system, the FM modulator is to selectively turn FM modulation off for a pulse. In accordance with any preceding example of the LIDAR system, in one example, the FM modulation is to be turned off for the pulse during a frequency up sweep. In accordance with any preceding example of the LIDAR system, in one example, the FM modulation is to be turned off for the pulse at a beginning of a transition from frequency down sweep to frequency up sweep. In accordance with any preceding example of the LIDAR system, in one example, the FM modulation is to be turned off for the pulse during a frequency down sweep. In accordance with any preceding example of the LIDAR system, in one example, the FM modulation is to be turned off for the pulse at a beginning of a transition from frequency up sweep to frequency down sweep. In accordance with any preceding example of the LIDAR system, in one example, the TOF signal information comprises an amplitude modulation (AM). In accordance with any preceding example of the LIDAR system, in one example, the active modulator comprises a Mach-Zehnder modulator (MZM). In accordance with any preceding example of the LIDAR system, in one example, the active modulator comprises an optical attenuator. In accordance with any preceding example of the LIDAR system, in one example, the active modulator comprises an optical circuit to AM modulate an optical amplifier gain signal. In accordance with any preceding example of the LIDAR system, in one example, the detector comprises an in-phase/quadrature (I/Q) detector to extract an AM part of the reflection and an FM part of the reflection. In accordance with any preceding example of the LIDAR system, in one example, the LIDAR system includes: a splitter to send the FM modulated signal into a transmit (TX) path and a local oscillator (LO) path; wherein the active modulator is in the TX path to provide the TOF signal information on the frequency modulated signal for transmission, and the LO path is not provided with the TOF signal information.

In general with respect to the descriptions herein, in one example, a method includes: modulating a light signal with frequency modulation (FM) to generate an FM modulated signal; encoding the FM modulated signal with a time of flight (TOF) signal with an active modulator to generate an FM and AM modulated signal; emitting the FM and AM modulated signal; and processing to a reflection of the FM and AM modulated signal to generate a target point set, including frequency processing to generate target points based on range and Doppler information, and TOF processing to provide TOF range information.

In one example of the method, modulating the light signal includes selectively turning FM modulation off for a pulse. In accordance with any preceding example of the method, in one example, modulating the light signal includes turning off for the pulse during a frequency up sweep. In accordance with any preceding example of the method, in one example, modulating the light signal includes turning off for the pulse at a beginning of a transition from frequency down sweep to frequency up sweep. In accordance with any preceding example of the method, in one example, modulating the light signal includes turning off for the pulse during a frequency down sweep. In accordance with any preceding example of the method, in one example, modulating the light signal includes turning off for the pulse at a beginning of a transition from frequency up sweep to frequency down sweep. In accordance with any preceding example of the method, in one example, the TOF signal information comprises an amplitude modulation (AM). In accordance with any preceding example of the method, in one example, the active modulator comprises a Mach-Zehnder modulator (MZM). In accordance with any preceding example of the method, in one example, the active modulator comprises an optical attenuator. In accordance with any preceding example of the method, in one example, the active modulator comprises an optical circuit to AM modulate an optical amplifier gain signal. In accordance with any preceding example of the method, in one example the method includes, extracting an AM part of the reflection and an FM part of the reflection an in-phase/quadrature (I/Q) detector. In accordance with any preceding example of the method, in one example, the method includes: sending the FM modulated signal into a transmit (TX) path and a local oscillator (LO) path; wherein the active modulator is in the TX path to provide the TOF signal information on the frequency modulated signal for transmission, and the LO path is not provided with the TOF signal information.

In general with respect to the descriptions herein, in one example, a light detection and ranging (LIDAR) system includes: a light source to generate a light signal; an optical circuit including a frequency modulation (FM) modulator to FM modulate the light signal as an FM modulated signal; an active modulator to provide time of flight (TOF) signal information with the FM modulated signal as a power and frequency modulated signal; an emitter to emit the power and frequency modulated signal; a detector to receive a reflection of the power and frequency modulated signal; and a processing device to apply processing to the reflection to generate a target point set, including frequency processing to generate target points based on range and Doppler information, and TOF processing to provide TOF range information; and optics to transmit the power and frequency modulated signal from the optical circuit and provide a reflection of the power and frequency modulated signal to the detector.

In one example of the LIDAR system, the FM modulator is to selectively turn FM modulation off for a pulse at a beginning of a transition from frequency down sweep to frequency up sweep. In accordance with any preceding example of the LIDAR system, in one example, the FM modulator is to selectively turn FM modulation off for a pulse at a beginning of a transition from frequency up sweep to frequency down sweep. In accordance with any preceding example of the LIDAR system, in one example, the TOF signal information comprises an amplitude modulation (AM). In accordance with any preceding example of the LIDAR system, in one example, the active modulator comprises a Mach-Zehnder modulator (MZM), an optical attenuator, or an optical circuit to AM modulate an optical amplifier gain signal. In accordance with any preceding example of the LIDAR system, in one example, the TOF signal information comprises an amplitude modulation (AM). In accordance with any preceding example of the LIDAR system, in one example, the optical circuit comprises a first optical circuit, and further comprising a second optical circuit, wherein the first and second optical circuits are to modulate the light signal, and wherein the optics is to transmit power and frequency modulated signals from the first optical circuit and second optical circuit, and provide reflections of the power and frequency modulated signals to the detectors for processing. In accordance with any preceding example of the LIDAR system, in one example, the LIDAR system includes: a splitter to send the FM modulated signal into a transmit (TX) path and a local oscillator (LO) path; wherein the active modulator is in the TX path to provide the TOF signal information on the frequency modulated signal for transmission, and the LO path is not provided with the TOF signal information.

In one example of the LIDAR system, the TOF range information can be used by an automobile, motorcycle, bicycle, scooter, helicopter, or plane; automated driver assist systems in an automobile, motorcycle, bicycle, scooter, helicopter, or plane; or self-driving vehicle such as part of an automobile, motorcycle, bicycle, scooter, helicopter, or plane.

Besides what is described herein, various modifications can be made to the disclosed examples and implementations of the invention without departing from their scope. Therefore, the illustrations and examples herein should be construed in an illustrative, and not a restrictive sense.

What is claimed is:
1. A light detection and ranging (LIDAR) system, comprising:
    an optical source to transmit a first portion of a frequency modulated light signal toward a target;
    an active amplitude modulator to modulate, using a low-power mode, the first portion of the light signal at a section of a sweep signal to generate a pulsed light transmitted towards the target;
a first photodetector to receive a return beam from the target based on the pulsed light signal, wherein the return beam comprises: (1) an amplitude modulated (AM) signal portion comprising a first range value corresponding to a signal propagation delay between the LIDAR system and the target and (2) a first frequency modulated (FM) signal portion comprising a second range value, adjusted by a Doppler shift caused by a relative velocity of the target, to produce a Doppler-adjusted range value;
a memory;
a processor, coupled to the memory and the first photodetector, to:
determine a target range value for the target based on the first range value; and
determine a target velocity value for the target based on a difference between the Doppler-adjusted range value and the first range value.

2. The LIDAR system of claim 1, further comprising:
the active amplitude modulator to further:
modulate a second portion of the light signal to produce a second (FM) signal portion transmitted towards a local oscillator; and
the first photodetector further to:
combine the second (FM) signal portion with the first (FM) signal portion to produce the Doppler-adjusted range value.

3. The LIDAR system of claim 1, wherein the active amplitude modulator is further to:
modulate, for a period of time, the first portion of the light signal at the section of the sweep signal, wherein the section is a beginning of the sweep signal.

4. The LIDAR system of claim 3, wherein the active amplitude modulator is further to:
determine, based on receipt of a control signal at the active modulator, a start to the period of time for the low-power mode based on the first portion of the light signal.

5. The LIDAR system of claim 3, wherein the active amplitude modulator is further to:
determine, based on receipt of a control signal at a different photodetector, a start to the period of time for the low-power mode based on the return beam.

6. The LIDAR system of claim 1, wherein the sweep signal comprises an upsweep signal.

7. The LIDAR system of claim 1, wherein the sweep signal comprises a downsweep signal.

8. The LIDAR system of claim 1, wherein the active amplitude modulator comprises a Mach-Zehnder modulator (MZM).

9. The LIDAR system of claim 1, wherein the active amplitude modulator comprises an optical attenuator.

10. The LIDAR system of claim 1, wherein the active amplitude modulator comprises an optical circuit to modulate an optical amplifier gain signal.

11. A light detection and ranging (LIDAR) system, comprising:
a light source to generate a frequency modulated light signal for transmission toward a target;
an optical circuit including:
an active amplitude modulator to modulate, using a low-power mode, the frequency modulated light signal at a section of a sweep signal to generate a pulsed light transmitted towards the target;
a first photodetector to receive a return beam from the target based on the pulsed light signal, wherein the return beam comprises: (1) an amplitude modulated (AM) signal portion comprising a first range value corresponding to a signal propagation delay between the LIDAR system and the target and (2) a first frequency modulated (FM) signal portion comprising a second range value, adjusted by a Doppler shift caused by a relative velocity of the target, to produce a Doppler-adjusted range value;
a processing device, coupled to the first photodetector, to:
determine a target range value for the target based on the first range value; and
determine a target velocity value for the target based on a difference between the Doppler-adjusted range value and the first range value; and
optics to transmit the pulsed light and direct the return beam to the first photodetector.

12. The LIDAR system of claim 11, further comprising:
the active amplitude modulator to further:
modulate a second portion of the light signal to produce a second (FM) signal portion transmitted towards a local oscillator; and
the first photodetector further to:
combine the second (FM) signal with the first (FM) portion to produce the Doppler-adjusted range value.

13. The LIDAR system of claim 11, wherein the active amplitude modulator is further to:
modulate, for a period of time, the frequency modulated light signal at the section of the sweep signal, wherein the section is a beginning of the sweep signal.

14. The LIDAR system of claim 11, wherein the sweep signal comprises an upsweep signal.

15. The LIDAR system of claim 11, wherein the sweep signal comprises a downsweep signal.

16. The LIDAR system of claim 11, wherein the active amplitude modulator comprises a Mach-Zehnder modulator (MZM), an optical attenuator, or an optical circuit to modulate an optical amplifier gain signal.

17. A method comprising:
generating a first portion of a frequency modulated light signal to transmit from a LIDAR system toward a target;
modulating, using selective low-power mode of an active amplitude modulator, a first portion of the light signal at a section of a sweep signal to generate a pulsed light transmitted toward the target;
receiving a return beam from the target based on the pulsed light signal, wherein the return beam comprises: (1) an amplitude modulated (AM) signal portion comprising a first range value corresponding to a signal propagation delay between the LIDAR system and the target and (2) a first frequency modulated (FM) signal portion comprising a second range value, adjusted by a Doppler shift caused by a relative velocity of the target, to produce a Doppler-adjusted range value;
determining a target range value for the target based on the first range value; and
determining a target velocity value for the target based on a difference between the Doppler-adjusted range value and the first range value.

18. The method of claim 17, further comprising:
modulating a second portion of the light signal to produce a second (FM) signal portion transmitted towards a local oscillator; and combining the second (FM) signal portion with the first (FM) signal portion to produce the Doppler-adjusted range value.

19. The method of claim 17, wherein modulating the light signal at the section of the sweep signal comprises modulating the light signal of an upsweep signal.

20. The method of claim 17, wherein modulating the light signal at the section of the sweep signal comprises modulating the light signal of a downsweep signal.

21. The method of claim 17, wherein modulating comprises modulating with one or more of: a Mach-Zehnder modulator (MZM), an optical attenuator, or an optical circuit to modulate an optical amplifier gain signal.

* * * * *